(12) United States Patent
Schmidmer et al.

(10) Patent No.: US 10,687,122 B2
(45) Date of Patent: Jun. 16, 2020

(54) CONCEPT FOR DETERMINING THE QUALITY OF A MEDIA DATA STREAM WITH VARYING QUALITY-TO-BITRATE

(71) Applicant: OPTICOM DIPL.-ING. MICHAEL KEYHL GMBH, Erlangen (DE)

(72) Inventors: Christian Schmidmer, Nuremberg (DE); Michael Keyhl, Heroldsberg (DE); Matthias Obermann, Erlangen (DE); Roland Bitto, Nuremberg (DE)

(73) Assignee: OPTICOM Dipl.-Ing. Michael Keyhl GmbH, Erlangen (DE)

( * ) Notice: Subject to any disclaimer, the term of this patent is extended or adjusted under 35 U.S.C. 154(b) by 0 days.

(21) Appl. No.: 14/975,397

(22) Filed: Dec. 18, 2015

(65) Prior Publication Data

US 2016/0105728 A1 Apr. 14, 2016

Related U.S. Application Data

(63) Continuation of application No. PCT/EP2014/062853, filed on Jun. 18, 2014.

(30) Foreign Application Priority Data

Jun. 19, 2013 (DE) .......................... 10 2013 211 571

(51) Int. Cl.
*H04N 21/647* (2011.01)
*H04N 21/845* (2011.01)
(Continued)

(52) U.S. Cl.
CPC ... *H04N 21/64723* (2013.01); *H04N 21/2187* (2013.01); *H04N 21/23418* (2013.01);
(Continued)

(58) Field of Classification Search
CPC combination set(s) only.
See application file for complete search history.

(56) References Cited

U.S. PATENT DOCUMENTS

2002/0181408 A1 12/2002 Sirivara et al.
2007/0271590 A1 11/2007 Gulas et al.
(Continued)

FOREIGN PATENT DOCUMENTS

CN 1788499 A 6/2006
CN 101842811 A 9/2010
(Continued)

OTHER PUBLICATIONS

Webster, A. et al., "An objective video quality assessment system based on human perception", Proceedings of SPIE, SPIE-International Society for Optical Engineering; SPIE vol. 1913; XP002077307, ISSN: 0277-786X, Jan. 1993, pp. 15-26.

*Primary Examiner* — Alexander Gee
(74) *Attorney, Agent, or Firm* — Michael A. Glenn; Perkins Coie LLP

(57) ABSTRACT

Determining a quality of a media data stream including a sequence of data stream sections which transmit different media sections of a media content at quality-to-bitrate levels that vary across the media content, such as within the context of adaptive streaming, is configured to be more effective by deriving, from each data stream section, an identifier for the respective section, and by looking up, for each data stream section, a parameter set from a look-up table by means of the identifier derived for the respective data stream section, so that it is possible to aggregate the parameter sets and to determine the quality on the basis thereof.

13 Claims, 12 Drawing Sheets

(51) Int. Cl.
*H04N 21/4425* (2011.01)
*H04N 21/643* (2011.01)
*H04N 21/854* (2011.01)
*H04N 21/44* (2011.01)
*H04N 21/442* (2011.01)
*H04N 21/2187* (2011.01)
*H04N 21/234* (2011.01)
*H04N 21/2662* (2011.01)
*H04N 21/61* (2011.01)
*H04N 21/414* (2011.01)
*H04N 21/4143* (2011.01)

(52) U.S. Cl.
CPC ... *H04N 21/2662* (2013.01); *H04N 21/44008* (2013.01); *H04N 21/4425* (2013.01); *H04N 21/44209* (2013.01); *H04N 21/44227* (2013.01); *H04N 21/6125* (2013.01); *H04N 21/64322* (2013.01); *H04N 21/8456* (2013.01); *H04N 21/85406* (2013.01); *H04N 21/4143* (2013.01); *H04N 21/41407* (2013.01)

(56) References Cited

U.S. PATENT DOCUMENTS

| | | |
|---|---|---|
| 2007/0280296 A1 | 12/2007 | Suzuki et al. |
| 2009/0153668 A1 | 6/2009 | Kim et al. |
| 2010/0043044 A1* | 2/2010 | Li ............ G06T 7/0002 725/118 |
| 2010/0254629 A1 | 10/2010 | Pigeon et al. |
| 2011/0238789 A1* | 9/2011 | Luby ......... H04L 65/601 709/219 |
| 2012/0278441 A1 | 11/2012 | Li et al. |
| 2012/0297433 A1* | 11/2012 | Lindegren ...... H04N 21/23418 725/107 |
| 2013/0057703 A1* | 3/2013 | Vu ............ H04N 17/004 348/180 |
| 2013/0132727 A1* | 5/2013 | Petrovic ....... H04N 21/4627 713/176 |
| 2013/0170391 A1 | 7/2013 | Feiten et al. |
| 2013/0329781 A1* | 12/2013 | Su ............ H04N 21/23424 375/240.02 |

FOREIGN PATENT DOCUMENTS

| | | |
|---|---|---|
| CN | 103621145 A | 3/2014 |
| EP | 1622395 A1 | 2/2006 |
| JP | 2007324706 A | 12/2007 |
| JP | 2010507324 A | 3/2010 |
| JP | 2013541281 A | 11/2013 |
| KR | 1020060033717 A | 4/2006 |
| KR | 1020100081369 A | 7/2010 |
| WO | 2009/055899 A1 | 5/2009 |
| WO | 2012/143764 A1 | 10/2012 |

* cited by examiner

Presentation quality
- BS, player, (re-buffering, error concealment)
- device (smart TV, PC, tablet, smartphone)

Transmission quality
- (adaptive) streaming protocol / progressive download
- caching (CDN), bandwidth, packet loss

Media stream quality
- basic coding quality, bitrates, encoder settings (CBR/VBR)
- coder H.264, H.265

Content quality
- 4K, HD, SD; P/B; B/S

CONCEPT FOR DETERMINING THE QUALITY OF A MEDIA DATA STREAM WITH VARYING QUALITY-TO-BITRATE

CROSS-REFERENCE TO RELATED APPLICATIONS

This application is a continuation of copending International Application No. PCT/EP2014/062853, filed Jun. 18, 2014, which claims priority from German Application No. 10 2013 211 571.7, filed Jun. 19, 2013, which are each incorporated herein in its entirety by this reference thereto.

The present invention relates to determining a quality of a media data stream with varying quality-to-bitrate.

BACKGROUND OF THE INVENTION

In modern transmission technology, specific encoding methods for data reduction are available for transmitting audio and video signals. Said specific encoding methods are employed so as to provide the end user with the best possible quality as a function of the current capacity of the transmission channel.

FIG. 11 shows a typical transmission link to an end user as is currently used. It includes a database storing all kinds of media data to be transmitted, a streaming server undertaking delivery of the data over a network, the network itself, as well as the end user/client receiving the desired data. The media data may be a video, for example. A frequently asked question relates to the actual quality of the video perceived by the end user. It has turned out that the increasing proportion of adaptive video streaming techniques such as DASH (Dynamic Adaptive Streaming over http) or HLS (HTTP Live Streaming), for example, wherein the media data is provided in different quality levels on the server side may use a stable, or uniform, quality measure (quality metrics) that can assess different frame sizes and/or quality levels in a manner that is standardized m to the largest possible extent in order to evaluate the quality of the media contents that is perceived at the receiver's side.

Generally, quality concepts may be divided into three categories:

So called full-reference (FR) quality measurement techniques compare the original media content that is not degraded by compression to the media content whose quality is to be determined. What is disadvantageous here is the necessity to access the original version of the media content. So-called no-reference (NR) quality measurement techniques determine the quality exclusively on the basis of the media content received, or of the data stream that has been received and represents said media content. Possibly, this involves only detecting transmission artifacts and quantifying them for determining the quality measure. So-called reduced-referenced (RR) quality measurement techniques represent a kind of intermediate solution between the FR and NR techniques in that they do not exclusively use the received data stream, or the received media content, for determining the receiver-side quality, but wherein intermediate results determined in real time on the transmitter side contribute to determining the receiver-side quality. Said parameters or intermediate results are typically co-transmitted (co-coded) in the media data stream transmitted.

In particular in mobile applications, FR quality measurement techniques can hardly be implemented. A solution to this problem is described in US 2009/0153668 A1. On the transmitter side, quality analysis results received on the transmitter side are inserted into the transmitted data stream such as into the RTP extension header, for example, said quality analysis results typically being the result of an FR analysis of the media content transmitted. On the receiver side, a verification is performed to determine whether the transmitted media data stream has been transmitted in a manner free from artifacts. In phases during which this is the case, the quality information transmitted within the data stream itself are used for determining the received quality. In phases during which faulty transmission has occurred, i.e. where transmission artifacts have occurred, a quality estimation is performed at the receiver's side. Eventually, the receiver-side quality is derived from a combination of both quality measurements, i.e. of that obtained on the basis of the quality information transmitted during interference-free phases, and that which has been estimated at the receiver's side during interference-prone phases. Even though this approach results in that the reference media content need not be present at the receiver's side in order to apply an FR method, the method presented in the above-cited reference is disadvantageous in many respects and is not suitable for finding a satisfying solution in adaptive-streaming methods. Adaptive-streaming methods provide the individual clients with the media content in varying levels of quality. Naturally, the quality varies to a different degree for each client, depending on which bandwidth is currently available to said client. However, in order to provide varying qualities for a multitude of clients at the same time, adaptive-streaming methods typically resort to precoded data. For example, a video is divided into time slots, and precoded versions with highly diverse quality levels are created for each time slot. A predetermined protocol enables the clients to load the video in varying quality levels by switching between the individual quality levels at the time slot borders. Said time slots may have lengths of two to four seconds, for example, and are sometimes also referred to as chunks. However, FR quality measurement techniques such as ITU-T J.247, for example, that have been adapted to subjective tests, may use a duration that is longer than the chunk duration, i.e. that extends over several chunks, for determining the quality. Thus, in order to realize the method described in the US reference, a transmitter-side quality measurement would have to be specifically performed for each client on the transmitter side and be made available to the receiver side by means of extension headers, namely online and/or in real time for all clients. However, for many applications having many clients that are present at the same time, such an approach is unfeasible on account of its large expenditure in terms of time and energy.

US 2012/0 278 441 A1 describes a method of estimating the quality at the receiver's side, i.e. the quality actually perceived by the end user. One advantage indicated for said method is that it is said to consume only little computing power at the receiver's side and to be able to be performed at any point in time. In this manner, it is also possible, specifically, to use the receiver-side measurements for influencing the transfer of media data. The method proposed in the US document starts by providing the media content in different levels of quality on the transmitter side. If need be, a signature which represents the media content is created on the transmitter side, said signature depending more or less on the entire picture content and being more or less representative for the picture content. Said signature is transmitted, along with the picture content, to the receiver side such that at least the signature is received in a manner free from artifacts. On the receiver side, a signature is then produced, in the same manner, from the media content obtained and is subsequently compared to the signature also transmitted from the transmitter side so as to obtain a quality value QoE from the comparison. For mapping the comparison to the QoE value, a classification function is used which is either continuously trained and/or known in advance. The QoE value now indicates the quality at the receiver's side, for example in the categories of "excellent", "good", "adequate", and "poor". The QoE value is said to be able to be transmitted back to the transmitter side from the receiver side so as to be used by the media server there, so as to adapt the quality actually obtained at the receiver's side to that quality that is actually expected by means of measures such as re-routing the transmission path, changing the playing quality, or the like.

SUMMARY

According to an embodiment, a device for determining a quality of a media data stream including a sequence of data stream sections which transmit different media sections of a media content at quality-to-bitrate levels that vary across the media content may have: an identifier generator configured to derive from each data stream section an identifier for the respective section; a look-up unit configured to look up, for each data stream section, a parameter set from a look-up table by means of the identifier derived for the respective data stream section; and a aggregator configured to aggregate the parameter sets that are looked up for data stream sections that transmit media sections that lie within a test section of the media content; and a quality determiner configured to determine the quality on the basis of the aggregated parameter sets.

Another embodiment may have a server configured to store, in a look-up table, for each media section of a media content, for each of a plurality of quality-to-bitrate levels, a parameter set which describes a coding quality of a data stream section to which the respective media section at the respective quality-to-bitrate level is encoded, and an identifier which is associated with the parameter set and which can be derived, by a derivation specification that is the same for all of the data stream sections, from the data stream section to which the respective media section at the respective quality-to-bitrate level is encoded, and configured to respond to a request having an identifier by returning the quality parameter set associated with said identifier.

Another embodiment may have a device for generating a look-up table, the device being configured to generate, for each media section of a media content, for each of a plurality of quality-to-bitrate levels, a parameter set which describes a coding quality of a data stream section to which the respective media section at the respective quality-to-bitrate level is encoded, and an identifier which is associated with the parameter set and which can be derived, by a derivation specification that is the same for all of the data stream sections, from the data stream section to which the respective media section at the respective quality-to-bitrate level is encoded, and configured to respond to a request having an identifier by returning the quality parameter set associated with said identifier.

According to another embodiment, a method of determining a quality of a media data stream including a sequence of data stream sections which transmit different media sections of a media content at quality-to-bitrate levels that vary across the media content may have the steps of: deriving, from each data stream section, an identifier for the respective section; looking up, for each data stream section, a parameter set from a look-up table by means of the identifier derived for the respective data stream section; and aggregating the parameter sets that are looked up for data stream sections that transmit media sections that lie within a test section of the media content; and determining the quality on the basis of the aggregated parameter sets.

According to another embodiment, a method of generating a look-up table may have the steps of: for each media section of a media content, for each of a plurality of quality-to-bitrate levels, generating a parameter set which describes a coding quality of a data stream section to which the respective media section at the respective quality-to-bitrate level is encoded, and generating an identifier which is associated with the parameter set and which can be derived, by a derivation specification that is the same for all of the data stream sections, from the data stream section to which the respective media section at the respective quality-to-bitrate level is encoded, and Another embodiment may have a computer program including a program code for performing the method as claimed in claim 11, when the program runs on a computer.

Another embodiment may have a computer program including a program code for performing the method as claimed in claim 12, when the program runs on a computer.

The core idea of the present invention consists in having found that a quality of a media data stream comprising a sequence of data stream sections which transmit different media sections of a media content with quality-to-bitrate levels that vary across the media content, such as within the context of adaptive streaming, can be determined more effectively if an identifier is derived from each data stream section for the respective section and if for each data stream section, a parameter set is looked up from a look-up table by means of the identifier derived for the respective data stream section, so that it is possible to aggregate the parameter sets and to determine the quality on the basis thereof. This approach allows the data stream sections of which the media data stream of each client is composed as a function of its individual bandwidth situation that possibly changes over time to remain unchanged—nothing needs to be added to the data stream. In other words, it is not necessary to transmit quality information to the receiver side along with the media data stream. Rather, the parameters provided in the look-up table for the data stream sections suffice for determining the quality at each client at the receiver's side, namely regardless of the variation, selected for the respective client, of the quality-to-bitrate and even despite a test or analysis section wherein the quality is determined and wherein several media sections are located. In this manner, it is possible to resort to standardized measuring techniques adapted to subjective tests, such as ITU-T J. 247, for example, as a basis for determining the quality.

In accordance with an embodiment, the derivation of the identifier is performed by applying, e.g., a hash function to a non-decoded version of the respective data stream section. This enables effective distinguishability between the data stream sections of different qualities, the different media sections of a media content, and the different media contents themselves. In particular, this type of identifier derivation is inherently protected from changes in transmission: transmission artifacts as well as transcoding operations along the transmission link to the client result in that, with a sufficiently high level of probability, the look-up operation fails, so that parameter sets determined in advance by mistake, which consequently can essentially correlate with the coding quality but not with subsequent changes in the media data stream, cannot be used for determining the quality. Thus, the look-up operation implicitly also enables detecting transmission artifacts and/or transcoding operations if the identification is performed by means of the non-decoded version, e.g. at the elementary stream (ES) level.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
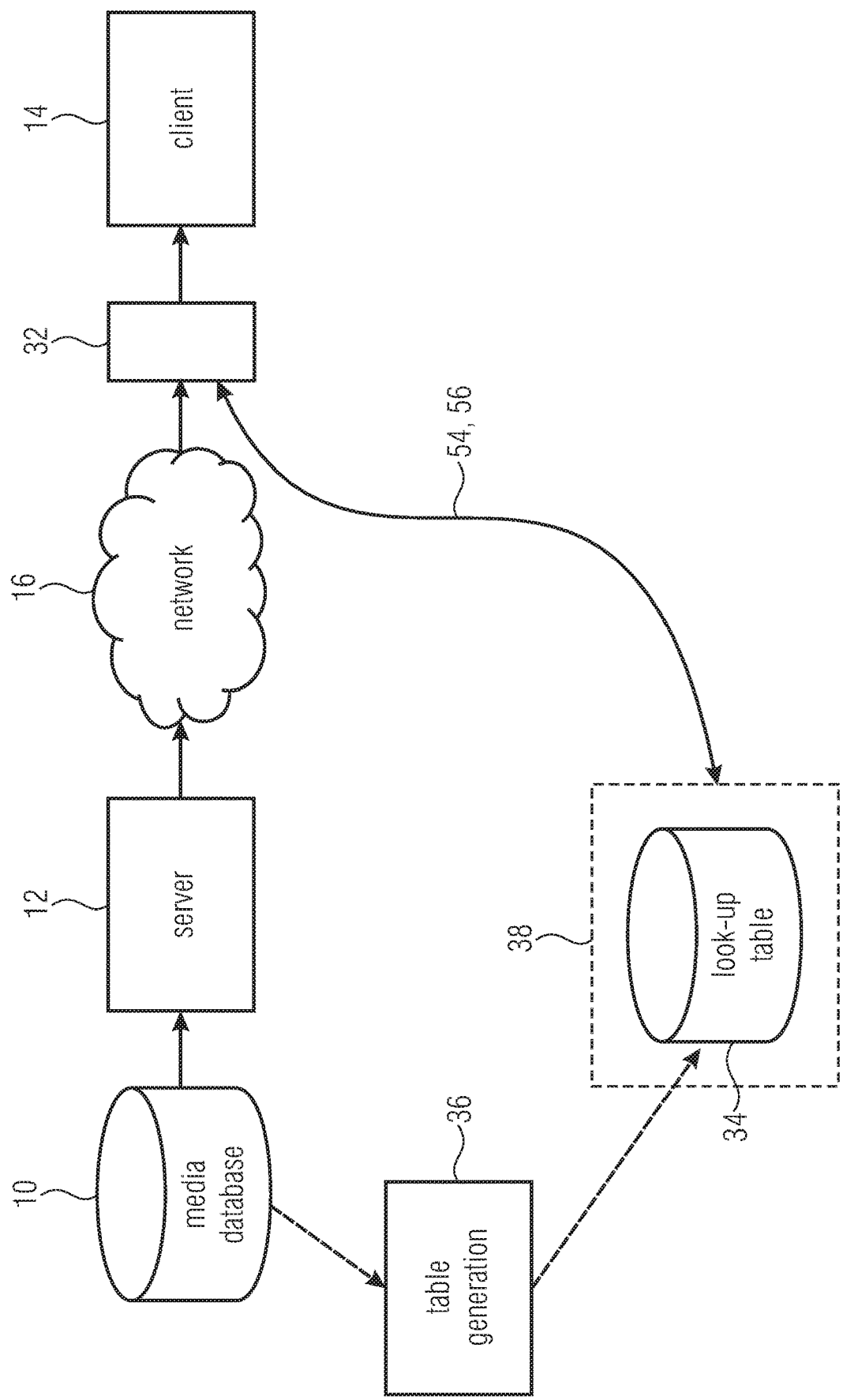
FIG. 1 shows a schematic block diagram of a network environment comprising a server and a client between which transmission of media data streams takes place with varying quality-to-bitrate, a quality determination concept being applied within said environment in accordance with an embodiment.
Figure 11:
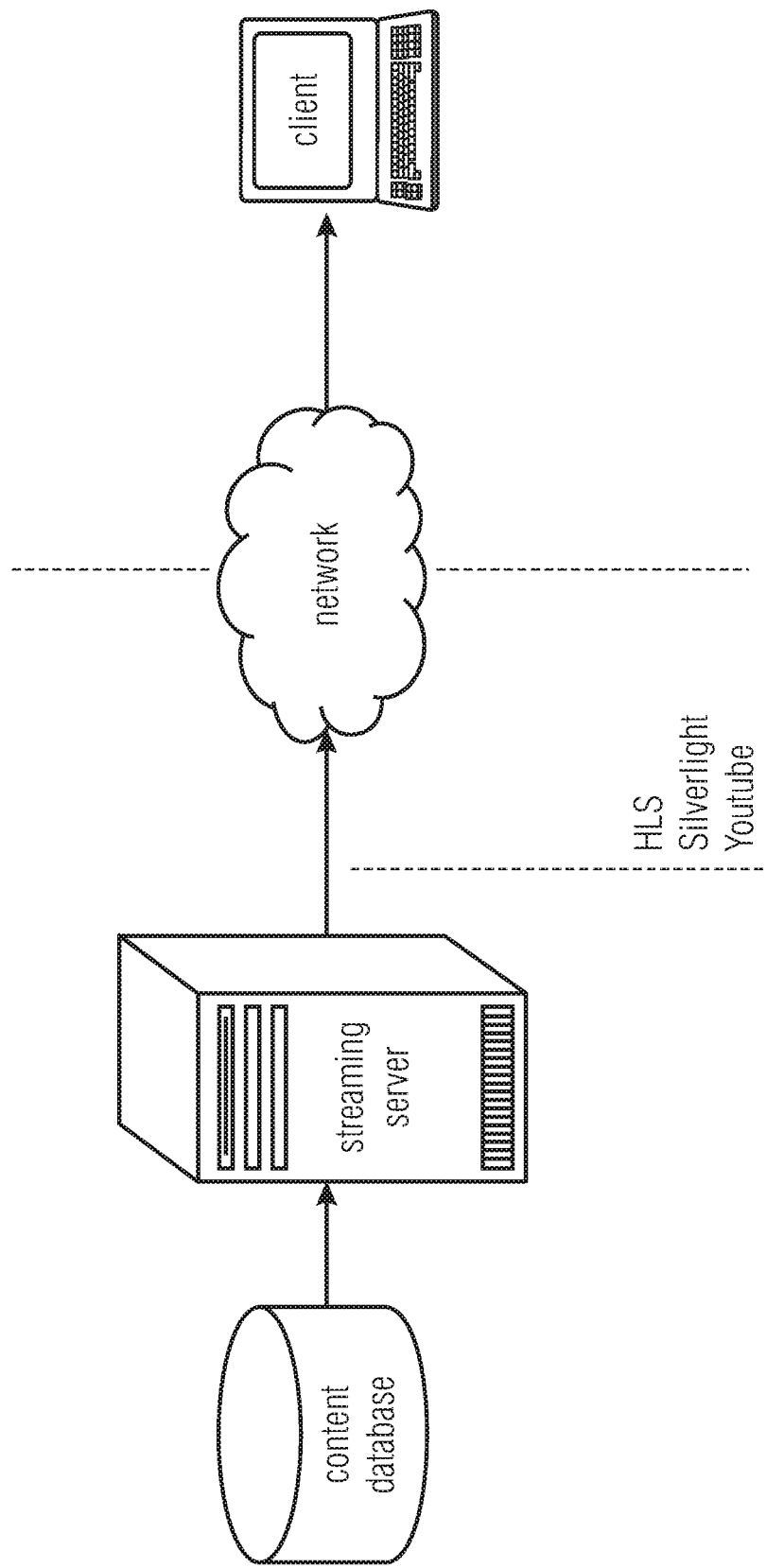
FIG. 11 shows a common server-client network environment with bitrate-adaptive media data stream transmission.

FIG. 1 shows an environment which comprises a server and a client and within which a concept for determining a quality of a media data stream in accordance with an embodiment of the present application is used. In particular, FIG. 1 shows a transmission link as is shown in FIG. 11, comprising a media database 10 wherein media contents are stored in a precoded manner, a server 12 having access to the media database 10, and a client 14 communicatively connected to the server 12 via a network 16. For example, the client 14 is a computer program, or an application, that runs on a terminal of a user. The terminal may be a mobile terminal, for example, such as a mobile phone, a notebook, or the like. The network 16 may comprise a wired portion and/or a wireless portion. The server 12 is a computer or a computer network, for example, and the media database 10 includes, e.g., one or several hard disks or other non-volatile memories.

Within the context of the communication between the server 12 and the client 14, the server 12 transmits, e.g., a media data stream to the client 14 via the network 16. By way of example, the following description shall assume that the media data stream is a video data stream which represents a video as the media content, but it shall be noted that subsequent embodiments may readily be transferred to other media contents, or other media data streams, such as audio contents, 3D grid models, or the like. By way of example, FIG. 2 illustrates the media data stream 18 and the media content 20 transmitted therewith, which here is a video by way of example, as was already mentioned.

Figure 2:
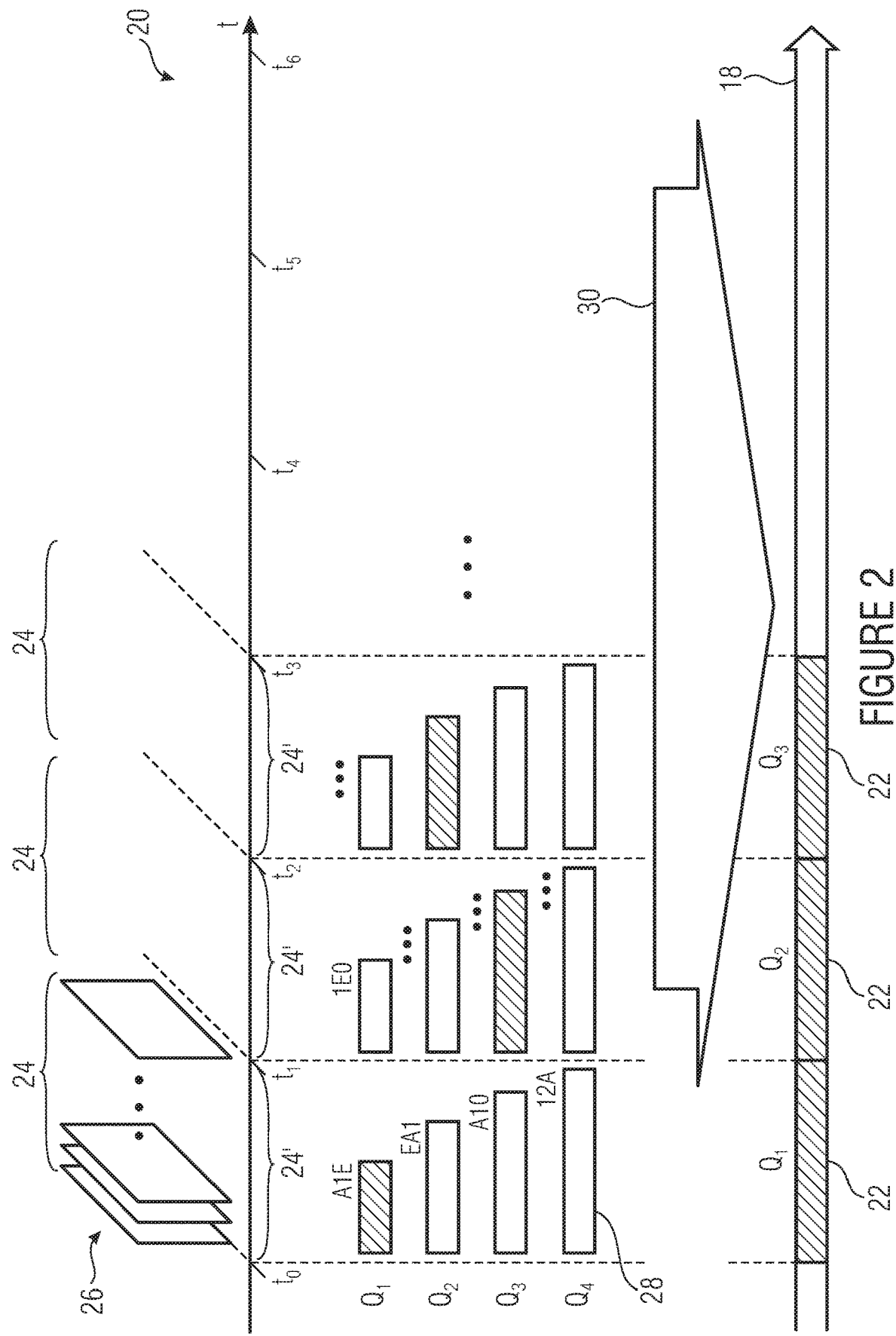
FIG. 2 shows a schematic drawing of a media data stream and of the media content encoded within same, as well as the existence of different quality-to-bitrate levels on the server side.

As is shown in FIG. 2, the media data stream 18 includes a sequence of data stream sections 22 into which different media sections 24 of the media content 20 are encoded in a quality-to-bitrate that varies across the media content. The video 20, which in FIG. 2 serves as an example of a time-varying media signal, is depicted, in FIG. 2, as being subdivided into the media sections 24, for example, in that directly mutually adjacent consecutive time slots of the video form the individual media sections 24. Each media section 24 thus includes a respective sequence of pictures 26 of the video 20.

The variation of the quality-to-bitrate with which the sections 24 are encoded into the data stream sections 22 is controlled, e.g., in accordance with suitable criteria so as to avoid, on the side of the client 14, idling of a data stream buffer, a so-called "stall", in the real-time reproduction of the media content, or video, 20 at the client, and, on the other hand, to avoid congestion of the buffer. The adaptive streaming may be http-based streaming of the media data stream 18, for example, such as DASH, according to which the server 12 provides the client 14 with information about available downloadable quality-to-bitrate levels via so-called MPDs, media presentation descriptions. On the basis of said levels, an adjustment module located within the client 14 may perform and change the selection among the available levels as a function of estimations made over the effectively available transmission bandwidth from the server 12 to the client 14 and as a function of a current buffer filling level at the client 14.

As is shown in FIG. 2, the media database 10 has a data stream section stored therein, for example, for each of a plurality of quality-to-bitrate levels $Q_1$-$Q_4$ for each media section 24. Said data stream sections are illustrated by rectangles 28 in FIG. 2. The media data stream 18 actually output for a client 14 thus is composed of a sequence, or a stream, of data stream sections 22, each data stream section 22 being associated with a different one of the media sections 24 and corresponding to one of the stored data stream sections 28 that are available for said media section 24. By way of example, FIG. 2 illustrates that the media sections 24 are transmitted within the media data stream 18 at the quality levels $Q_1$, $Q_3$, and $Q_2$, between times $t_0$, $t_1$, $t_2$, and $t_3$, but as was said above, said selection is dependent on the situation with regard to the individual clients 14. FIG. 2 indicates the situation-dependent quality-to-bitrate adjustment by arrow 30. As was described, said adjustment may be performed by the client 14, for example.

So as to determine the quality of the media data stream at the client 14 or at a different location along the transmission link between the server 12 and the client 14, the concept of determining the quality that will be described below provides that a device 32 derives identifiers from the data stream sections 22 so as to look up in a look-up table 34 on the basis thereof so as to obtain parameter sets for the data stream sections 22, to aggregate said parameter sets for one or more test or analysis sections, and to determine the quality therefrom. As will become clear from the description, the data stream sections 28 stored within the media database 10 need not be changed for this purpose, which makes it easier to introduce the quality determination concept into the existing infrastructure of media servers. Moreover, no other information needs to be additionally introduced into the server-client communication. The latter remains untouched. The content of the look-up table 34 is generated offline in advance by creating a table 36, which keeps the effort involved in determining the quality on the part of the device 32 reasonably low. Nevertheless, the concept for quality determination which will be described in more detail below allows quality determination in a form that constitutes the prerequisite for being adapted to subjective quality tests methods, such as the quality determination across a specific test or analysis section, or a predetermined time interval extending, for example, across several media sections 24, specifically despite the varying quality levels $Q_i$ of the sequence of data stream sections i (22).

It shall be noted that the media sections 24 mentioned so far actually have different meanings and were described to be identical merely for the sake of simplicity: media sections that are encoded within the media data stream separately from one another, such as GOPs, for example, and media sections for which parameter sets exist within the table 34 in each case. The former GOPs, for example, i.e. picture sequences, are decodable independently of one another, such as IPPP . . . PP picture sequences or the like. In units of such media contents, the media data stream 18, for example, might then change its quality-to-bitrate at the levels $Q_1$-$Q_4$. For each such media section 24, an identifier might be generated, i.e. the granularity of the variation of the quality-to-bitrate might be identical with the granularity of the identifier generation. However, this need not be the case. The following illustrations clearly show that the identifier generation may take place in relatively small units, for example, such as for each picture 26. Media sections bearing the reference numeral 24' are to refer to such a section of the media content 20 that is associated with a respective data stream section having a respective identifier. For a GOP, i.e. a self-contained picture sequence that can be decoded separately from the other GOPs, there would thus exist several media sections 24', i.e. several pictures, comprising several identifications, specifically for each quality-to-bitrate level. Data stream sections 22 are to be associated with said media sections 24'. Media sections 24 without an apostrophe, by contrast, designate such sections in units of which the bitrate may vary, such as GOPs, for example. As was already mentioned, both units/sections might coincide, but this need not be case, and in accordance with subsequent embodiments, this actually is not the case, even though they might be readily variable in this respect, namely with all intermediate forms, e.g. sections 24', that are larger than a picture but smaller than a GOP. Thus, in FIG. 2 there might also exist M*N data stream sections in the database for a section 24, namely for N quality levels and M subdivisions of the section 24 into sections 24'.

A possible setup of the device 32, or of the server 38 comprising the look-up table 34, will now be described with reference to FIGS. 3 and 4.

Figure 3:
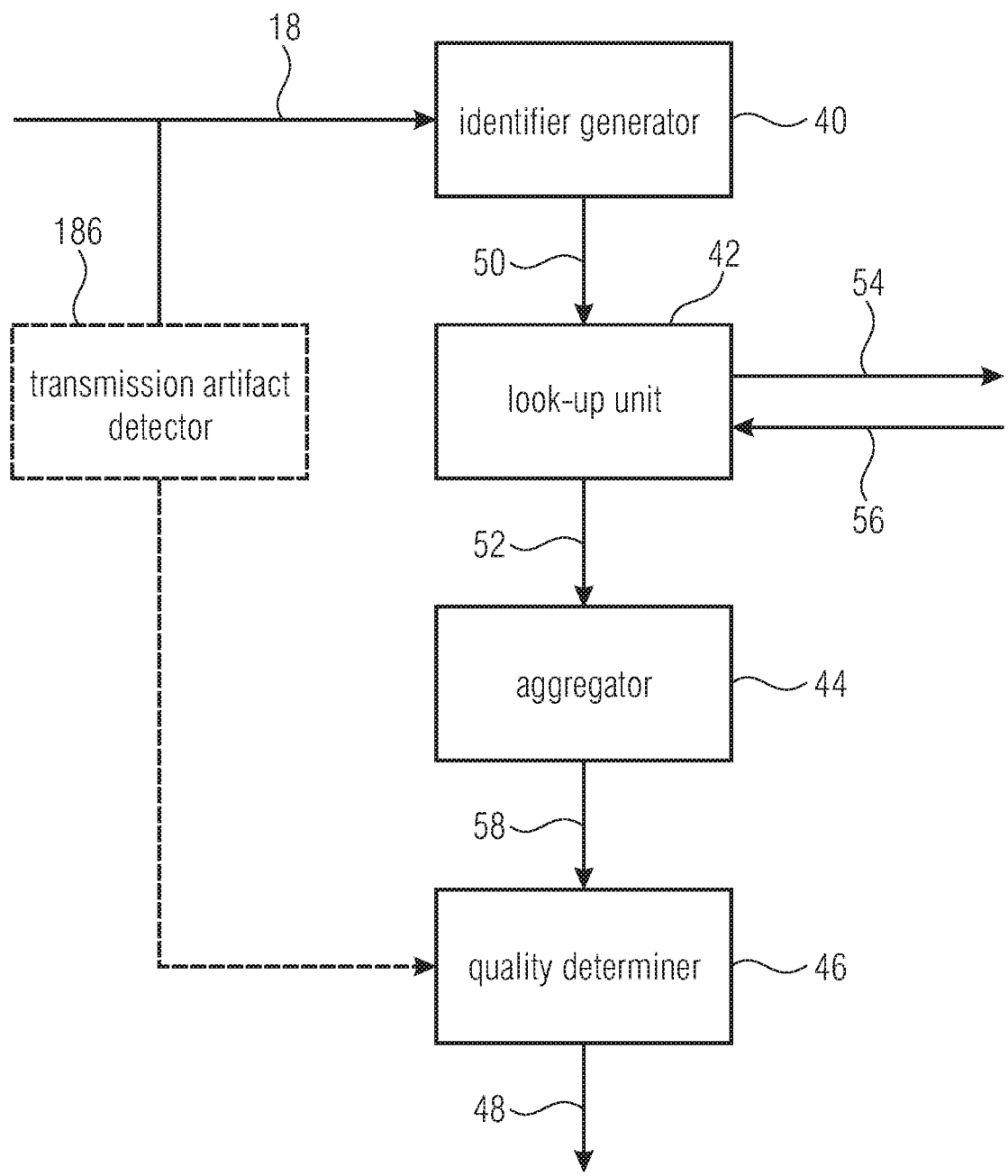
FIG. 3 shows a block diagram of the device for quality determination in accordance with an embodiment, the device accessing a look-up table prepared offline.

As is shown in FIG. 3, the device 32 includes an identifier generator 40, a look-up unit 42, a aggregator 44, and a quality determiner 46. As is shown in FIG. 3, the elements 40 to 46 may be connected in series, the identifier generator 40 receiving the media data stream 18, and the quality determiner 46 outputting the quality 48 of the media data stream.

The identifier generator 40 derives an identifier 50 for the respective section 24' from each data stream section 22 of the incoming media data stream 18. The look-up unit 42 obtains the identifiers 50 for the data stream sections 22 of the incoming media data stream 18. It looks up in the look-up table 34 of the server 38 for each data stream section 22 so as to obtain a parameter set 52 for each data stream section 22, the look-up unit 42 performing the look-up operation by means of the identifier 50 derived for the data stream sections 22 in that it sends, e.g., corresponding queries 54 to the server 38 and obtains, as a response 56, the parameter set pertaining to the identifier contained within the respective query. The parameter sets of the data stream sections 22 shall be addressed in more detail below. Briefly, they are measuring parameters containing, per section 24', for example per picture 26, within the respective media content 24' encoded within the respective data stream section 22, several parameters which describe a coding quality of the respective picture 26 or, more accurately speaking, a reproduction quality of the picture 26 in question for the case of interference-free transmission, it also being possible for the parameters to comprise, by way of example, one or more parameters per section 24' which describe the quality of the media content without any encoding interferences, i.e. of the original media content. Further details shall be given in the description which follows; however, it shall be noted that, as was already mentioned, the present application and the embodiments described below are not limited to videos. For example, the media sections 24 might also be consecutive time intervals of an audio signal or time slots of a time-varying grid model or the like. Generally, the parameter set for the associated data stream section 22 describes a coding quality, i.e. a deviation of the media content 24', which media content 24' is reproducible from the data stream section 22 and comprises the original encoding error that is not introduced by lossy encoding, and, optionally, a quality of the media content 24' in general.

The aggregator 44 aggregates the parameter sets 52 for a desired test or analysis section. A test section extends, for example, across a sequence of media sections 24 and, thus, also a sequence of sections 24'. Wth regard to FIG. 2, a test section might extend, for example, from the time $t_0$ to the time $t_6$. The length of the test interval meets the requirement placed upon corresponding subjective FR quality test methods, such as requirements regarding a specific minimum duration, continuity, i.e. the absence of time gaps, etc. The aggregator 44 thus outputs an aggregation 58 of parameter sets 52 that were looked up for data stream sections 22 that transmit media sections 24' that are located within a test section of the media signal, such as between $t_0$ and $t_6$ in FIG. 2, for example. As has already become clear from the above description, the aggregated parameter sets 52 may originate from different quality levels.

The quality determiner 46 thus obtains a plurality of aggregations 58, namely for all of the media sections 24' located within the corresponding test section of the media content 20, and on the basis of said aggregation 58 of parameter sets 52, it determines the quality 48, details on this being described in more detail below.

Figure 4:
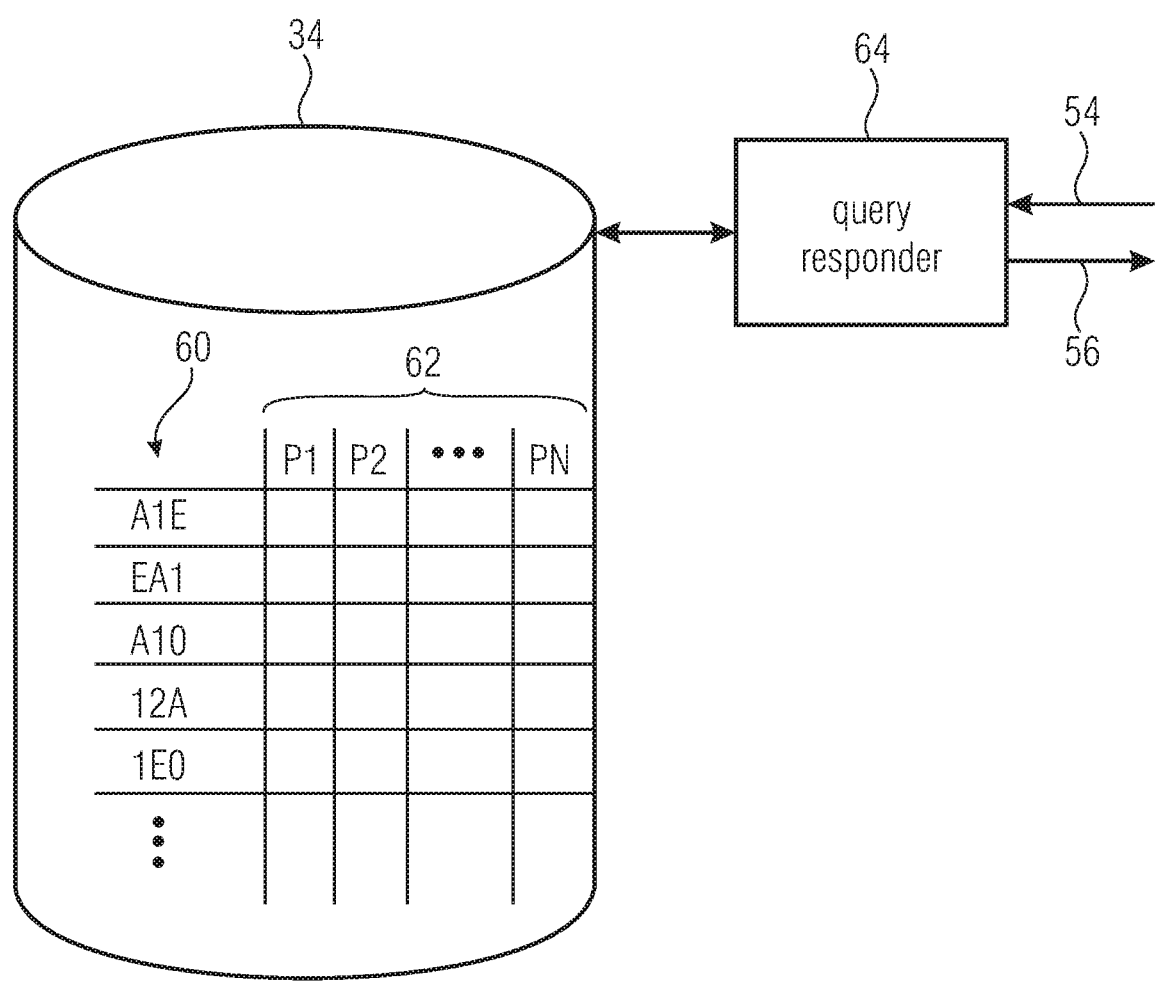
FIG. 4 shows a schematic block diagram of a server comprising a look-up table in accordance with an embodiment, it being possible for the server to interact with the device of FIG. 3.

Merely for completeness' sake, FIG. 4 illustrates the server 38 of FIG. 1 which includes the look-up table 34. For each data stream section 28 within the media database 10, the look-up table 34 has stored therein the identifier 60 as is generated, as a section 22 of the data stream 18, by the identifier generator 40 in the case of error-free transmission, and has stored therein the parameter set 62 which is associated with said data stream section, or which has been generated from the media section 24' associated with said data stream section 28. As is indicated in FIG. 4, each parameter set 62 may comprise, e.g., N different parameters. The parameter sets 62 relate to a media section 24, i.e., for example, to a picture 26 in each case, and several media sections 24' may be located within a media section 24, in units of which a client varies in terms of the fetched bitrate and/or quality. The server 38 includes a query responder 64 that is connected to the look-up table 34 and is configured to respond to a query 54, which comes from the device 32 and comprises a specific identifier, with the very parameter set 62 that is stored for this very identifier within the table 34 so as to return this very parameter set to the device 32 in a return transmission 56.

The communication 54 and 56 between the device 32 and the server 38 may also take place via the network 16, for example, such as via an internet connection. The server 38 may be a server of its own, separate from the server 12 and the media database 10. The look-up table 34 may be realized within a non-volatile memory, for example, and the query responder 64 may be implemented by a computer or a computer network, for example. The device 32 might be an application that is executed on that mobile device on which the client 14 is also executed, but a different arrangement and implementation of the device 32 is also possible, of course.

As has already become clear from the above description, an advantage of the approach of looking up the parameter sets by means of the identifier obtained from the data stream sections consist in that parameter set determination and, thus, setting up the look-up table 34, i.e. table generation 36, may be performed offline in advance, i.e. prior to the media stream transmissions to the clients 14 that actually take place. For completeness' sake, FIG. 5 now shows a possibility of table generation 36. According to said possibility, for each data stream section 28 within the media database 10, identifier generation 66 is performed, specifically in such a manner that the same identifier results as it does with the identifier generator 40 in the event of undisturbed transmission, and parameter set determination 68 is performed.

Now that an overview of the elements involved in the quality determination concept has been given with reference to FIGS. 1 and 5, an explanation shall be given below by way of example of how this concept, or interplay, of elements may be implemented in concrete terms, for example. In this context, relatively specific illustrations shall be given, e.g., in relation to the parameter sets, but also in relation to other elements described above, and all of said concretization possibilities shall be understood to be individually applicable to the above previous implementation. This is why FIGS. 1 to 5 shall be repeatedly referred to below, and as far as possible, the reference numerals as have been used in the descriptions of FIGS. 1 to 5 shall be reused.

As was described in the introduction to the description of the present application, an important question in media data transfers relates to the type of the quality of the media data that actually arrives at the final user. As has already been roughly explained with regard to the previous figures, the determination may be made by accessing parameters obtained in advance. As is described in FIG. 1, what is involved in this are a table generation module 36, which analyzes the media database 10, the look-up table 34, which provides a database for storing the parameter sets calculated from the media database 10, and the device 32, i.e. a device employed, e.g., at the client's side for calculating the current quality.

In the assessment of the overall quality of the media data at the final user, or client, 14, two disturbance patterns are to be noted, in principle:
1) the coding quality, which is dependent, inter alia, on the encoding method used and the settings used, such as the average bitrate, and
2) the transmission quality, which describes current disturbances in the transmission channel. The transmission quality takes into account disturbances such as packet losses, bit errors, and others.

The previous description of FIGS. 1 to 5 so far has actually addressed the coding quality only. For example, when identifier generation as was described takes place within the non-decoded domain by way of example, it is already sufficiently ensured thereby that faulty data stream sections result in detectably faulty identifiers since they do not match, for example for the media section 24 associated in each case, with any of the data stream sections 28, that are stored in the look-up table 34 for said media section 24, of the current media content 20. As will be described below, it would be possible for the quality determiner 46 to combine the quality which is determined for a test section or several test sections from a corresponding aggregation 58 of parameter sets 52 and which reflects the coding quality with estimations regarding a quantity of quality disturbances so as to obtain an overall quality.

Decomposing the overall quality of a signal into the prescribed subareas of coding quality and transmission quality enables objective methods to optimize the computing power that may be used for quality prediction. What is to be noted here is that the coding quality does not depend on the current disturbances within the transmission channel. Therefore, it would be possible, in principle, to fully calculate same in advance for different input sequences and encoding settings, i.e. across entire test sections. As was described in the introduction to the description of the present application, however, this is difficult for the mere reason that the bitrate varies in a client-individual manner in temporal units that are smaller than a test section. In other words, the encoding settings constantly change as a function of a current state of the transmission channel. In addition, the overall quality is not only a linear concatenation between the above-mentioned quality levels. This is why it makes more sense to determine benchmark data, which are referred to as "parameters" above and sometimes as "indicators" below, in advance and to use same for estimating the quality as a function of the actual transmission characteristic.

Figure 6:
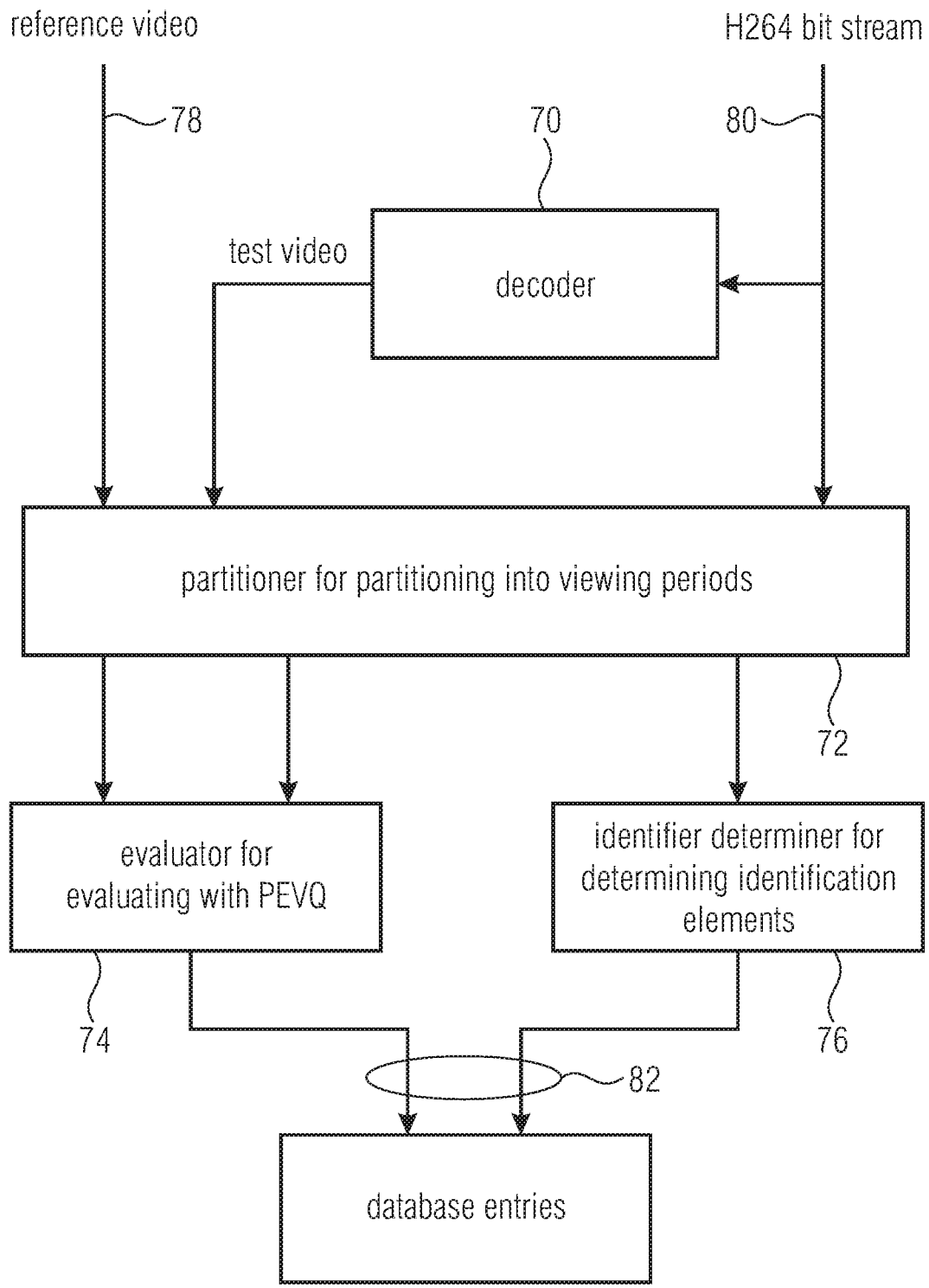
FIG. 6 shows a block diagram of a possible implementation of a device for creating a look-up table in accordance with an embodiment.

FIG. 6 shows a device for determining the parameter sets in advance for media transmission by using the example of a video as the media content, i.e. a device that is suitable for performing the table generation 36.

As can be seen, the device of FIG. 6 includes a decoder 70, a partitioner 72, an evaluator 74, an identifier determiner 76, as well as an input 78 for receiving a reference media content, here specifically a reference video, an input 80 for receiving a media data stream at a constant quality-to-bitrate level, as well an output 82 for outputting the database entries, or look-up table entries, of the look-up table 34, i.e. the pairs of identifiers 60 and associated parameter sets 62. The partitioner 72 comprises three inputs, an input connected to the input 78, a further input directly connected to the input 80, and a third input connected to the input 80 via the decoder 70 so as to obtain a decoded, or reproducible, version of the media data stream at the input 80, which media data stream can be encoded by means of H.264, for example, as is indicated in FIG. 6, such that a test video is present at the output of the decoder 70, or at the input of the partitioner 72. The partitioner 72 partitions incoming an reference video, an incoming test video, and an incoming media data stream into viewing periods which essentially, e.g. in terms of their sizes, correspond to the previously mentioned test sections, and forwards, for each viewing period, the corresponding data stream section 22 of the media data stream at the input 80 to the identifier determiner 76, and forwards the media sections 24', such as frames 26, from the test video that lie within the respective viewing period, as well as the corresponding sections, e.g. pictures, from the reference video to the evaluator 74. For simplicity's sake, it shall be assumed below that the partitioning into viewing periods takes place without any gaps, so that the viewing periods seamlessly adjoin one another, but deviations therefrom are also feasible.

The identifier determiner 76 determines the identifier for all of the incoming data stream sections 22 in the same manner that was described above and/or with the same mapping as is also done by the identifier generator 40 within the device 32. It shall be mentioned that the identifier generator may include hash value formation, but the identifier might also be a composition of the hash value and further IDs assigned, for example, to the individual media contents within the media library 10 for reasons of distinguishability.

Evaluation within the evaluator 74 takes place as will be explained in more detail below and leads, for each media section 24', from each viewing period, to a corresponding parameter set associated with the identifier that has been obtained from the data stream section 22 in which the corresponding media content 24' is encoded.

The process that has just been described is repeated, for each of the quality-to-bitrate levels in which a respective media content, or video, 20, is present within the media database 10, in that the corresponding media data stream 18 is applied to the input 80 while the reference video is present at the input 78 and represents the media content without any encoding losses. The quality-to-bitrate level remains constant each time. More specifically, the data stream section 22 of the media data stream 18 at the input 80 each time represents the associated media section 24' in a quality-to-bitrate level that is identical for all of the data stream sections 22, the level being changed in between the consecutive times. In this manner, a pair of identifier and associated parameter set results in the look-up table, as was already described, for each quality-to-bitrate level for each media section 24' of the media content 20.

Figure 5:
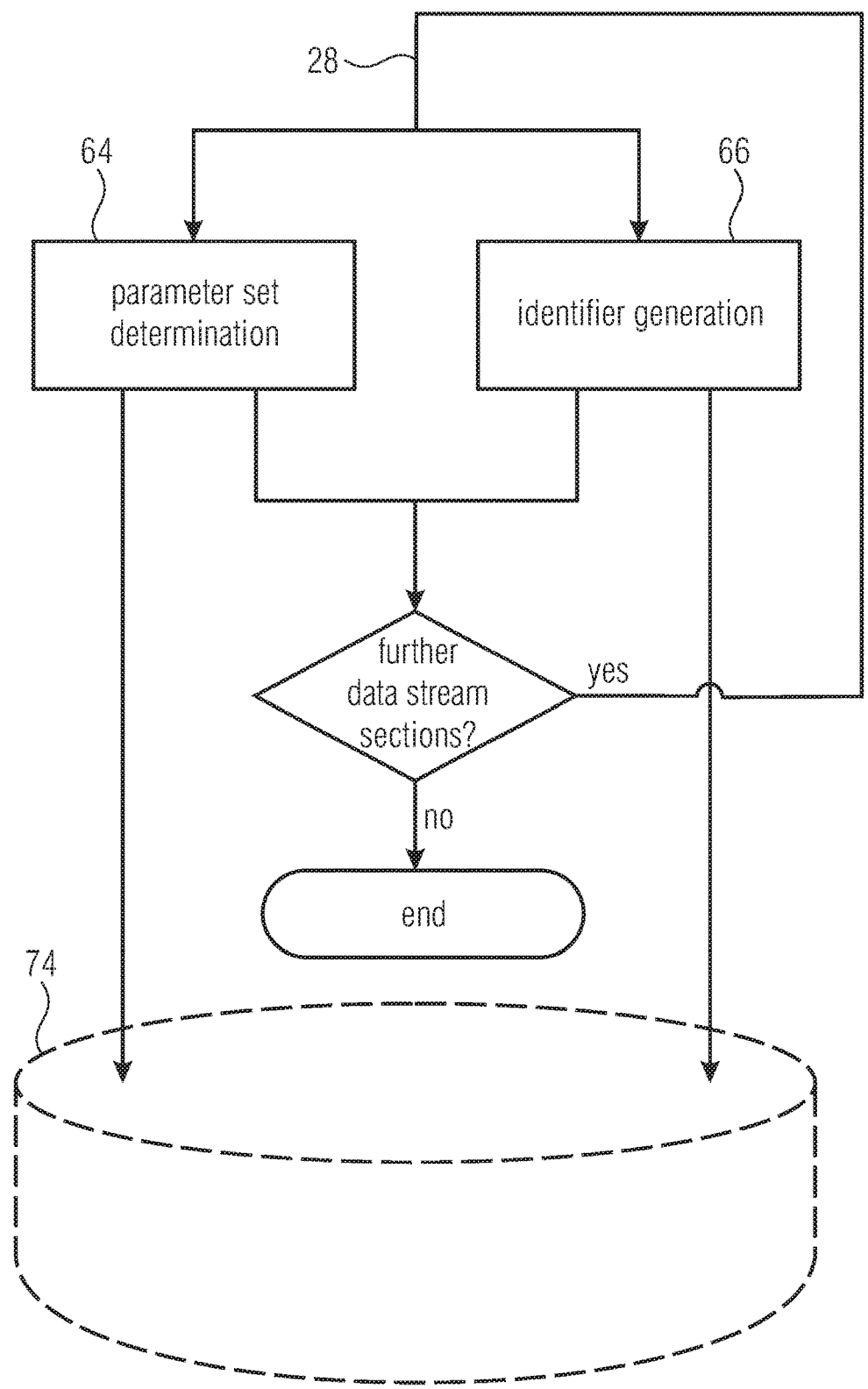
FIG. 5 shows a flowchart of creating a table in accordance with an embodiment.

In principle, thus, the evaluator 74 of FIG. 6 adopts parameter set determination 64 of FIG. 5, and the identifier determiner 76 adopts identifier generation 66 of FIG. 5. The partitioner 72 performs partitioning into viewing periods which in the embodiment of FIG. 6 correlate with the evaluation performed by the evaluator 74 in order to obtain the parameter sets. The viewing periods are such periods which can meet the same criteria as are used for selecting a test section by the quality determiner 46 within the device 32. Thus, a viewing period may extend across several media sections 24, for example. Nevertheless, the evaluator 74 generates, from the evaluation of a viewing period, a parameter set per media section 24' that lies within the current viewing period.

More specifically, therefore, a reference video as well as the media data stream that is to be transmitted, comprising a respective constant quality-to-bitrate level, and the test video that is decoded from the media data stream, in their original lengths serve as inputs for the device of FIG. 6. The evaluator 74 may use an objective testing method such as ITU-T J.247 or ITU-T J.341, for example, so as to map a subjective test. Such objective testing methods are adapted for picture sequences used in such a test. The duration of such a picture sequence, or of such a viewing period, is, e.g. between 10 and 16 seconds or between 6 and 20 seconds, inclusively in each case. The partitioner 72 thus partitions, e.g., the reference video, the test video and the incoming media data stream into such viewing periods and forwards the reference and test videos, which are partitioned in this manner, to the evaluator 74. Within the objective measurement technique performed within the evaluator 74, the parameters, or indicators, i.e. a parameter set, are then determined for each media section 24' within the viewing period 72, for example for each picture 26 within the respective viewing period 72. A more detailed description of the method that may possibly be employed for extracting the parameter sets will follow. What also will follow is a description of the parameters, or indicators.

Just as a parameter set results for each section 24', such as for each picture, for example, in the evaluation of the viewing periods into which the reference video and the test video are partitioned by the partitioner 72, the identifier determiner 76 determines, for each media section 24', e.g. for each picture 26, an identifier, which will also be referred to as identification element below, from the respective data stream section 22. The identification elements are calculated with regard to the sections 24' such that precise association of the section 24' encoded within the bitstream 18 with the database entries is possible at a later point in time. As the identification element, an MD5 sum or a different "HASH" sum to be determined in an unambiguous manner may be used, for example.

As was already described above, the indicators, or the parameter set, are subsequently stored within a database along with the "HASH" sum and, optionally, possibly further control elements such as information about the picture geometry, for example. Thus, any information that may be used for determining the coding quality is available within the database 34 for a multitude of video sequences and encoding settings at the frame level.

Figure 7:
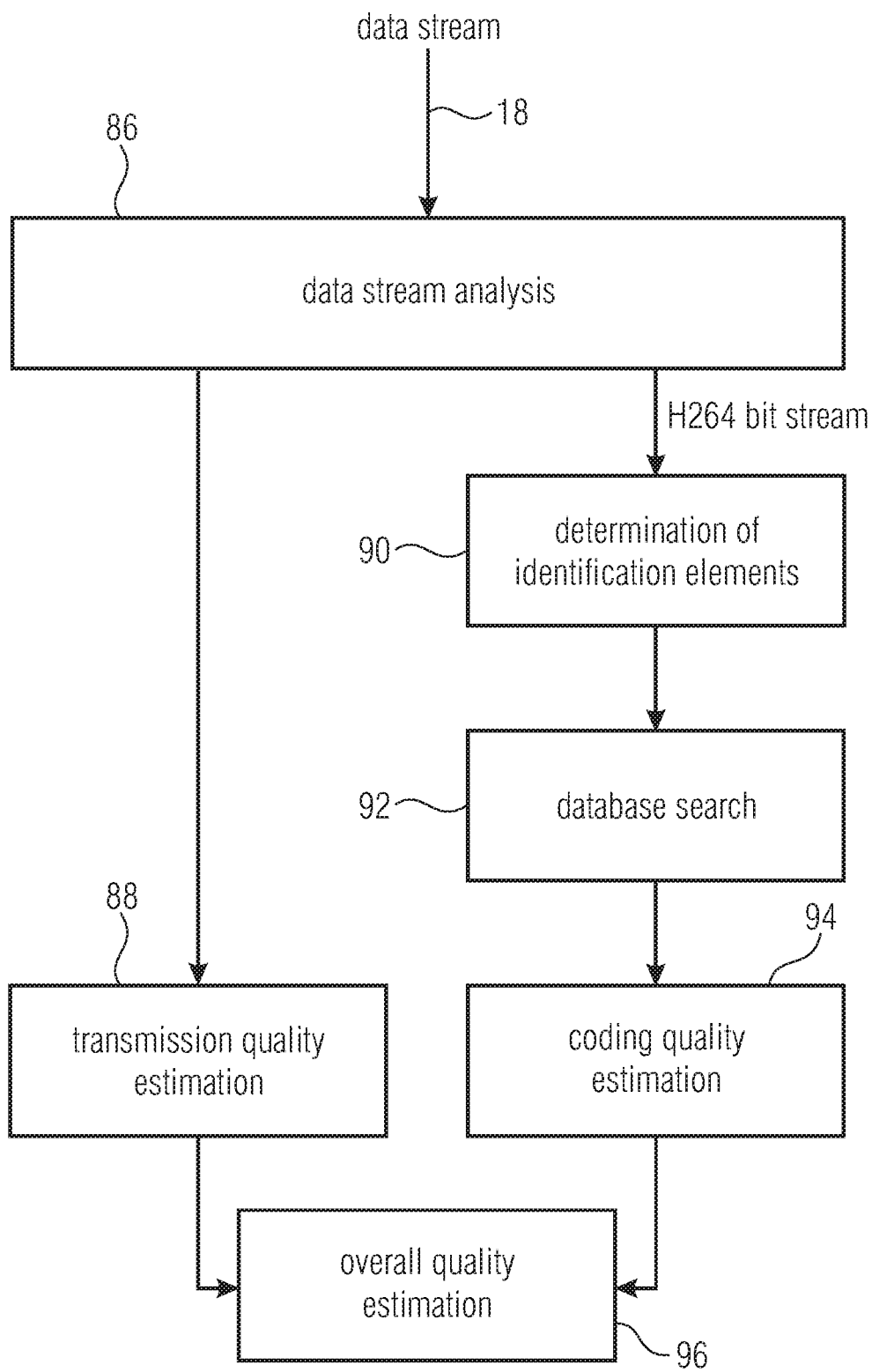
FIG. 7 shows a flowchart of a possible mode of operation of the device for determining the quality at the receiver's side in accordance with an embodiment.

FIG. 7 shows a method of estimating an overall quality of a currently transmitted signal or of a media data stream 18 transmitted to a client 14. Said method is performed by the device 32, for example by that of FIG. 3, the functionality of FIG. 3 being supplemented, however, in order to perform the method of FIG. 7, as will be described below. As was already mentioned, the illustrations are illustrated for a video stream even though they may also readily be transferred to other media contents than a video.

As is shown in FIG. 7, the incoming media data stream 18 is initially subjected to a data stream analysis 86, the data stream 18 being that one, for example, which arrives at the receiver, or, in general terms, at the receiver's side, such as at a client 14, for example, as was already mentioned. In order to obtain the media data stream 18, the data may be tapped off the network card, for example. In the data stream analysis 86, the video-relevant data, or the media data stream 18 which here is a video data stream by way of example, are analyzed for transmission artifacts, such as packet losses, bit errors, time delays, packet repetitions, or the like. The analysis may be performed, for example, within a transmission artifact analyzer or detector 186 which is connected in parallel with the identifier generator 40 and/or also obtains the media data stream 18. On the basis of the analysis result, the current transmission quality, which describes the disturbances of the transmission link, may then be estimated in a step 88. At the same time, the sequence of data stream elements 22 which represents an H.264 bitstream, for example, by means of which identifiers, or identification elements, are calculated, is extracted from the incoming media data stream 18, namely per picture section 24', such as at the picture level or for each video frame, for example. The identifier determination 90 is performed by the identifier generator 40, for example. As was already mentioned, the same algorithm, or the same mapping, is employed for the identification elements calculated in step 90 as is employed for generating the database in step 66, or in the identifier determiner 76. Therefore, if the "HASH" values, or the identifiers, cannot be determined due to transmission disturbances, unambiguous association of the picture sections 24' with entries in the look-up table 34 may occur, which step is referred to as a database research 92 in FIG. 7, a step performed by the look-up unit 42 in FIG. 3. The indicators, or parameter sets, looked up for each picture section 24', e.g. picture 26, are then used for calculating the current coding quality, namely in a step 94 of encoding-quality estimation, which is performed by the aggregator 44 and quality determiner 46 in FIG. 3. The only precondition for this is that the device 32 has access to the previously established database 34. This can be ensured, for example, by a lossless data line or by a database 34 that has already been transmitted in advance. A more detailed description of the process of encoding-quality estimation 94 will be given below.

It shall be noted at this point that the embodiments described so far also support modern streaming methods such as HLS (HTTP Live Streaming), for example.

A step 96 includes finally estimating the overall quality on the basis of the estimated coding quality and the estimated transmission quality of steps 88 and 94. This step may also be performed, e.g., by the quality determiner 46 of FIG. 3, as can the transmission quality estimation 88.

Thus, the above embodiments solve the problem that adaptive-streaming methods employ different encoding qualities, depending on the existing transmission channel capacities. The coding quality may even be changed during transmission if the transmission channel properties change. Due to utilization of the look-up table 34, which stores any number of quality combinations at the frame level, the appropriate indicators can be extracted in accordance with above embodiments.

A more detailed description of how the parameter set determination 64, or the evaluator 74, may be configured shall be given below. As was already described, established standardized measurement techniques which in practice have already proven to provide a good quality prediction, can be used for extracting the indicators, or the parameter set. For example, the method standardized by the ITU under the name of ITU-T J.247 can be used. For completeness's sake it shall also be mentioned that other, non-standardized methods, or NR methods, can also be used for obtaining the parameter sets, which, however, is generally accompanied by a loss in terms of measuring accuracy.

Figure 8:
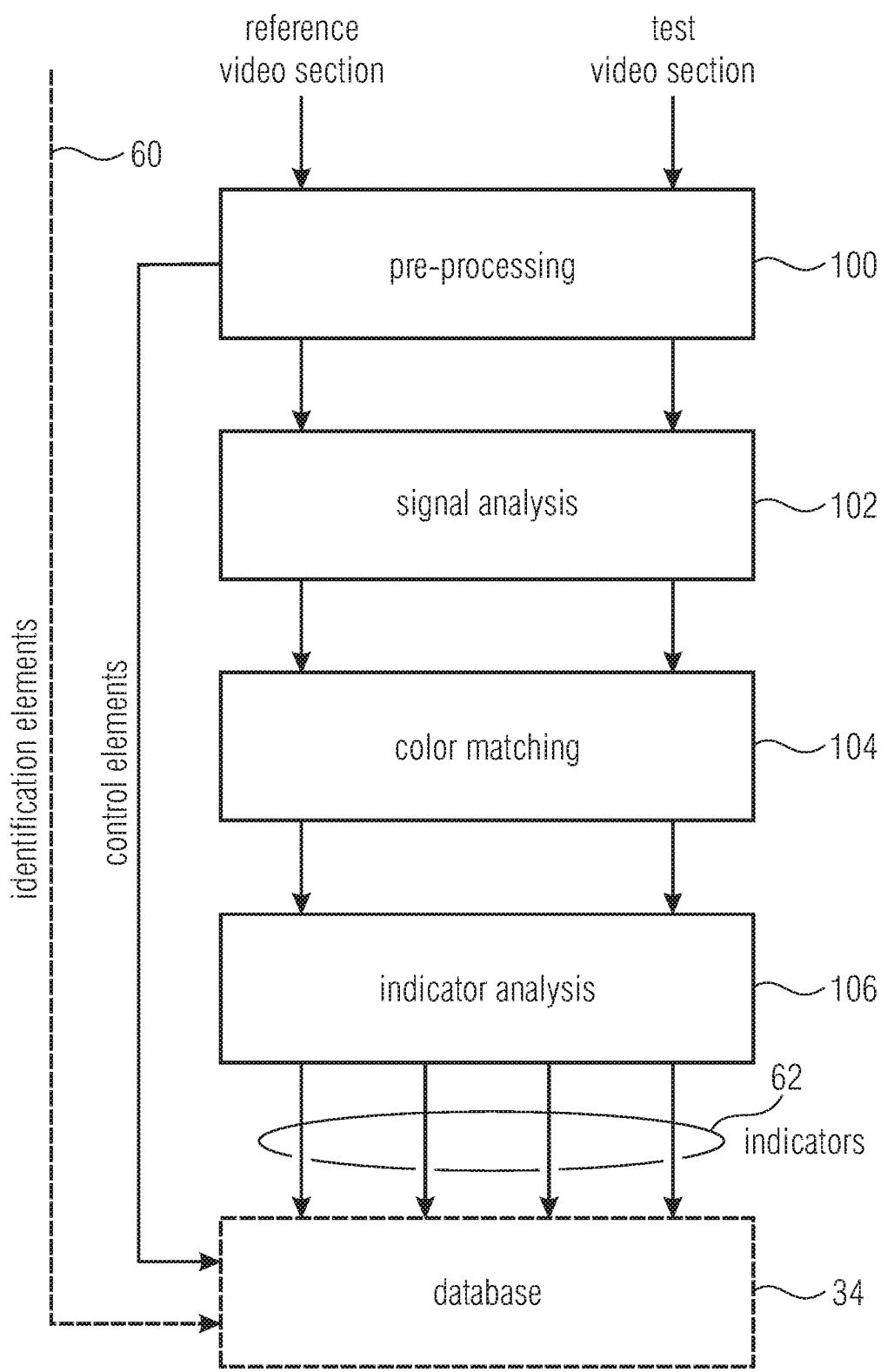
FIG. 8 shows a flowchart of parameter set determination in accordance with an embodiment.

FIG. 8 shows an example of a possible sequence of steps that might be performed, in particular, by the evaluator 74 of FIG. 6, it being assumed that the evaluator 74 obtains, for determining the parameter set for a viewing period, both the test video obtained from the received media data stream 18 by means of decoding and the associated reference video. The following illustrations however, shall illustrate that the partitioning into viewing periods when generating the parameter sets is not absolutely mandatory. Said partitioning merely makes it easier to use fully standardized measurement techniques for generating the parameter sets.

As the input parameters, the temporal sections from the reference video that are partitioned into viewing periods as well as the corresponding temporal section that is to be evaluated and that originates from the video that possibly exhibits a encoding disturbance are provided to the parameter set extraction method of FIG. 8. The duration of the temporal viewing period and/or test section may depend both on the typical duration of the subjective test by means of which the objective measurement techniques are evaluated and on the requirements of streaming methods wherein the possible quality switching sections 24 are specified. In the HLS method, for example, the transfer sections 24 are present as individual files, so that ideally, integer multiples of said lengths are selected. Typical values are section lengths of, e.g. 4 to 14 seconds or, alternatively, 2 to 25 seconds, inclusively in each case.

It is ensured that there is no temporal offset between that section of the reference video which corresponds to the viewing period and that of the test video. If need be, an algorithm for temporally associating the frames is employed.

Within the context of a preparation 100, a first step, the individual sections are read in and transferred to internal picture representation. This step is optional and may be dispensed with if no picture representation transfer is required.

In a signal analysis 102, the individual video sections, i.e. the respective viewing period, or the respective test section, are analyzed and characterized at the picture level. Here, the picture sequence analysis takes place, wherein changing picture sequences and individual still-frame sections are recognized. In this block, the original video and the test video are analyzed separately.

A subsequent step 104 comprises performing color matching. Said step includes a histogram analysis of the individual gray scales and color components, and subsequently the distribution between the original video and the test video is adapted. Slightly different system color displays (color representations) and system distortions are removed here since they are typically hardly recognized by a viewer. The removal results in that the subsequent indicator analysis 106 is insensitive to said faulty color displays (color misrepresentations) and distortions.

In particular, the indicator analysis 106 involves extracting that set of disturbance elements that is relevant for quality assessment, i.e. the parameter set. Calculation of a parameter set is performed in each case for a section 24', i.e., for example, for a picture in each case, within the test video, so that a parameter set is available for each frame. As was already said, another example according to which the media section 24' is larger than only one frame would also be feasible. The properties of the parameters, or indicators, will be described in more detail below.

As was described above, the set 62 of parameters, or indicators, is then stored into the database, or look-up table, 34, specifically along with, or associated with, the respective identifier 60 which has been obtained from the data stream section 22 and which contains the respective media section 24', for which said set 62 has been determined, in a encoded form, here an individual picture, for example. As is shown in FIG. 8, it is possible for the indicators of the set 62 to be buffered along with control elements for postprocessing at a later point in time. Examples of such control elements were already mentioned above. The setup of the database, or look-up table, 34 is freely selectable at this point and is dependent on the size and the existing software and hardware requirements. MySQL may be mentioned as an example of a database that may be employed here. It is worth mentioning that generation of the identifier ensures unambiguous association between the identifier 60, the picture, or frame, i.e. the media section 24' in the test video, as well as the associated parameters, or the set 62 of parameters. It shall also be noted that the individual indicator values of the set 62 may be available as an IEEE floating-point number, for example. If J.247 is used for generating the parameters, a database entry 82 may consist, for example, of six parameters for the set 62, of one identifier 60 and, optionally, one control element.

The possibilities of how the parameters might be selected for the previous embodiments, i.e. which dimensions said parameters might have, how they are produced, etc., will be addressed below. However, it shall be noted that the description which follows is merely exemplary and that there are possibilities of variation, of course. As was also already mentioned above, it shall be assumed, by way of example, in the description which follows that the parameter sets are determined for media sections 24' which correspond to individual pictures, or frames, 26. Calculation is performed while using or following J.247. However, only an outline shall be given below of how parameters are calculated for each frame in the test video, i.e. the reconstructed version of the media content. For a detailed mathematical description, please additionally also refer to the recommendation ITU-T J.247, namely chapter B.1.10, which is incorporated herein by reference.

Figure 9:
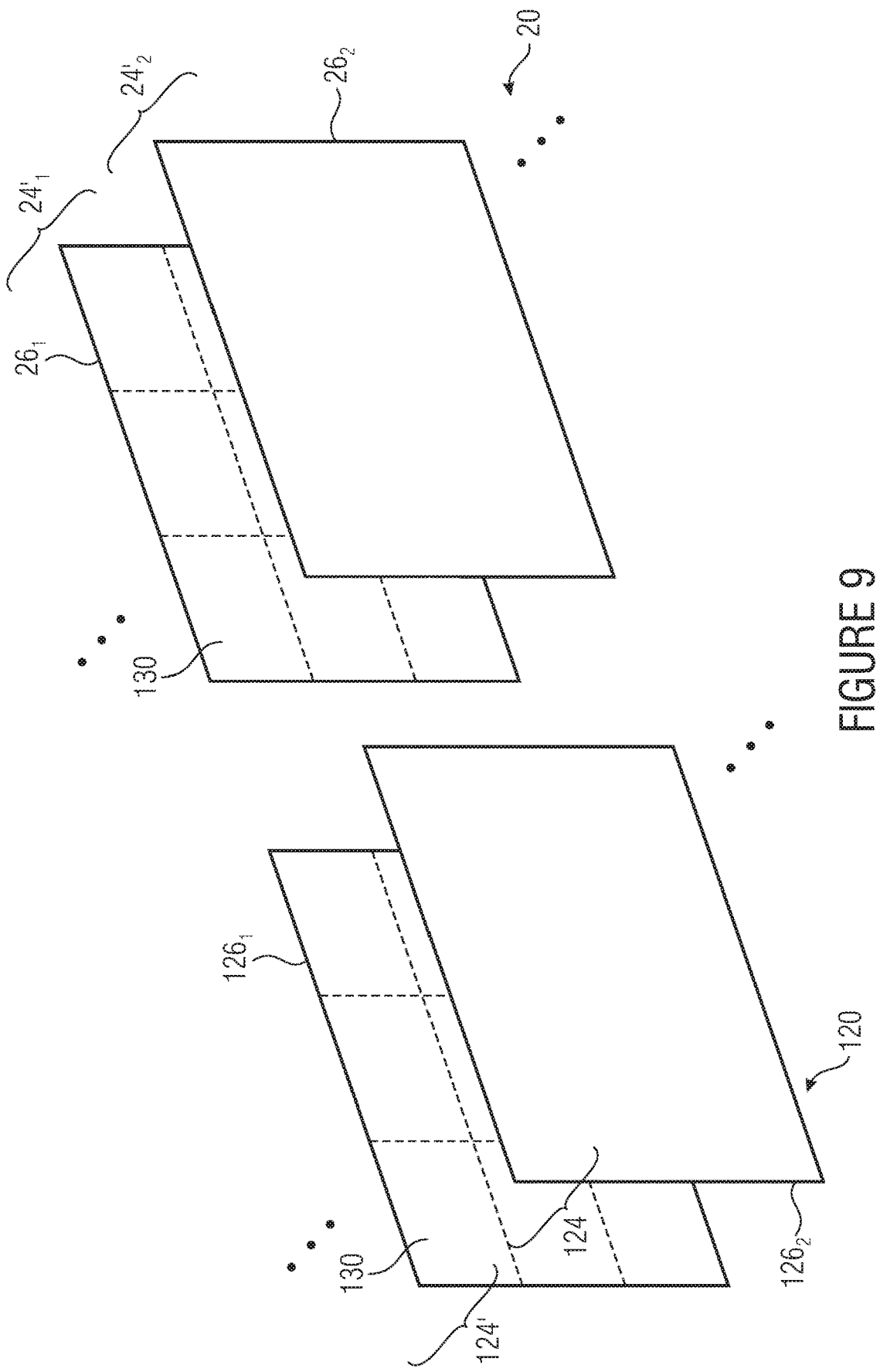
FIG. 9 schematically shows a part of a media signal that is available on the server side, comprising a specific constant quality-to-bitrate level with a temporally corresponding section of a reference signal so as to illustrate the parameter set determination in this.

In accordance with the embodiment described below, therefore, the following analysis, namely either one or several or all of the following, is/are performed in the table generation 36 in FIG. 1 or within the context of the indicator analysis 106 or by the evaluator 74:

Similarity Analysis:

Within the context of a similarity analysis, for example, a correlation-based measure of a similarity between a reconstructed version of each media section 24', in this case, therefore, by way of example, of each picture 26, of the video 20, and of a corresponding section 124' of a reference video 120, is determined. The reader shall be reminded once again that the analysis generally takes place offline. The video 20 is one that originates, due to encoding, from a media data stream which consists of sequence of data stream sections having constant quality-to-bitrate levels. Since in the present embodiment, the media sections 24' are individual frames, the similarity analysis thus compares a picture 26 of the test video 20 to a temporally corresponding picture 126 of the reference video 120 that is not impaired by encoding losses. In order to illustrate the temporal sequence of pictures 26, or 126, in the test video 20 and the reference video 120, two successive pictures of said videos are shown in FIG. 9 and distinguished by indices 1 and 2, by way of example. For calculating the correlation-based measure, a correlation between, e.g., picture $26_1$ and $126_1$ is determined across the picture region at different picture sections, and subsequently, the correlation-based measure is determined on the basis of suitable averaging of the locally obtained correlations. Thus, for example, the picture $26_1$ from the test video 20 and, in particular, from the test section, as well as the temporally corresponding picture $126_1$ of the reference video 120 are partitioned into individual picture regions 130, and the correlation in these regions 130 between the reference video and the test video is determined; for example, the average correlation value is determined as the similarity measure and/or the correlation-based measure so as to obtain one of the parameters. Disturbances in the area structures of the pictures are particularly emphasized with the aid of this indicator, or parameter. The similarity analysis is determined for each media section 24', i.e. here for each frame 26, within the test section, or viewing period.

Edge Analysis.

The edge analysis leads, for each picture 26, and/or each media section 24', to a measure of differences of edges present within the respective picture 26 and edges present within the corresponding picture 126. The edges are determined, for example, within the luminance plane and/or from the luma component of the pictures 26 and 126. As distinguishing metrics, for example, mere subtraction of corresponding edge pictures that are obtained from pictures 26 and 126 is used. Suitable averaging across the picture region may be reused in order to achieve the one measure of the edge difference. The averaging may be based on an L5 norm, for example. In other words, the edge analysis involves comparing edge pictures within the luminance plane of the reference picture and the test picture and examining them for differences. Averaging of the disturbance in order to determine the indicator value is performed via a weighted L5 norm, for example. When viewing a picture, the eye often orients itself by the edges. Edge disturbances are therefore perceived in a particularly pronounced manner.

Block Analysis:

A block analysis results in a measure of block disturbances in each picture 26 and/or media section 24' within the test section. Block formation is a frequent error category that occurs with modern "codecs". This disturbance is also referred to as "blockiness" or "tiling". The error is calculated in a manner similar to edge analysis. However, for this value only those edges are evaluated which have been added in the test picture 26 as compared to the original picture 126. Local averaging may be effected here via a weighted L2 norm, for example, so as to achieve the measure of block disturbances. Just like the other analyses, i.e. the similarity analysis and the edge analysis, as well as the subsequent analyses, the block analysis is performed for each picture 26 within the viewing period, and/or the test section.

Chrominance Analysis:

A chrominance analysis results in a measure of a difference of chrominance planes within the respective picture 26 and the corresponding original picture 126. Values of this measure and/or indicator are based on the difference of the chrominance planes of the pictures. What follows is weighted averaging of, e.g., a difference of the normalized picture points between the original and the test picture for determining the indicator value.

Analysis of the Temporal Course of the Disturbance:

An analysis of the temporal course of the disturbance results in a measure of differences of temporal changes of edges that are present in a picture 26 of the test video 20, and temporal changes of edges that are present in the corresponding picture 126 of the reference video 120. The temporal changes of edges of the picture $26_2$ of the test video 20 are determined, for example, in that the edge pictures of this picture $26_2$ and of the temporally preceding picture $26_1$ are initially determined, such as, again, within the luminance level, and in that the difference of these two temporally successive edge pictures is compared to a corresponding difference of edge pictures that were obtained, in the reference video 120, from the temporally corresponding pictures $126_1$ and $126_2$. Just like in the other analysis options, edge pictures are also determined via corresponding high-pass filtering, for example. Suitable local averaging may be reused in order to achieve a measure of the differences of these temporal changes. The background of the analysis to the temporal course of the disturbances is that unexpected disturbances exhibiting temporal changes are perceived by a viewer as being very annoying. In order to evaluate this disturbance category, the temporal changes of the edge picture of the reference video and the test video are logged as they occur. The indicators that are calculated here describe the difference of the changes in the edge picture for the current picture, or frame, between the reference picture 126 and the test picture 26. Since the viewer reacts differently as a function of whether a disturbance is added or a part is removed, two indicators, or parameters, may be calculated for this category: local averaging here is performed with the aid of a weighted L5 norm for added disturbances and a weighted L2 norm for missing portions. However, these are merely examples, after all, from which one may possibly deviate.

If all of the above analyses and resulting parameters are incorporated, a number of six parameters results in each parameter set 62, said six parameters describing the respective media section, here the respective picture, as results from the data stream section which is unambiguously associated with the identifier, which in turn is stored in the table 34 as belonging to said parameter set 62.

Subsequently, possible implementation details for quality determination by the quality determiner 46 or the encoding-quality estimation 94 will be described. The above-outlined storage of the indicators and/or parameters within the picture plane, for example, i.e. for media sections 24' of the size of single picture, within the database 34 enables calculating, at a later point in time, the quality of a section of the video sequence that is obtained at the receiver's side in the device 32, namely for a test section and/or viewing period. Therefore, a more detailed description will be given below of the device 32 which performs the encoding-quality estimation at the receiver's side. The device 32 may access the individual indicators and/or parameters only. As was described above, for said access it uses the identification elements, or identifiers. Entries 82 for all pictures and for all quality levels are available within the database 34.

However, before continuing the description of the possible implementation details it shall be noted that the viewing period for receiver-side encoding-quality determination on the basis of the parameter sets in table 34 need not match the viewing periods that are used offline for generating the parameter sets, or the viewing periods that are used at the receiver's side and offline for table generation. Different starting and end times are possible. It may be advantageous in this context to make sure that no interruptions occur within the viewing periods, or within the test sections. In this manner it is possible to detect the switching processes of modern streaming methods so as to estimate the actual quality curve.

Figure 10:
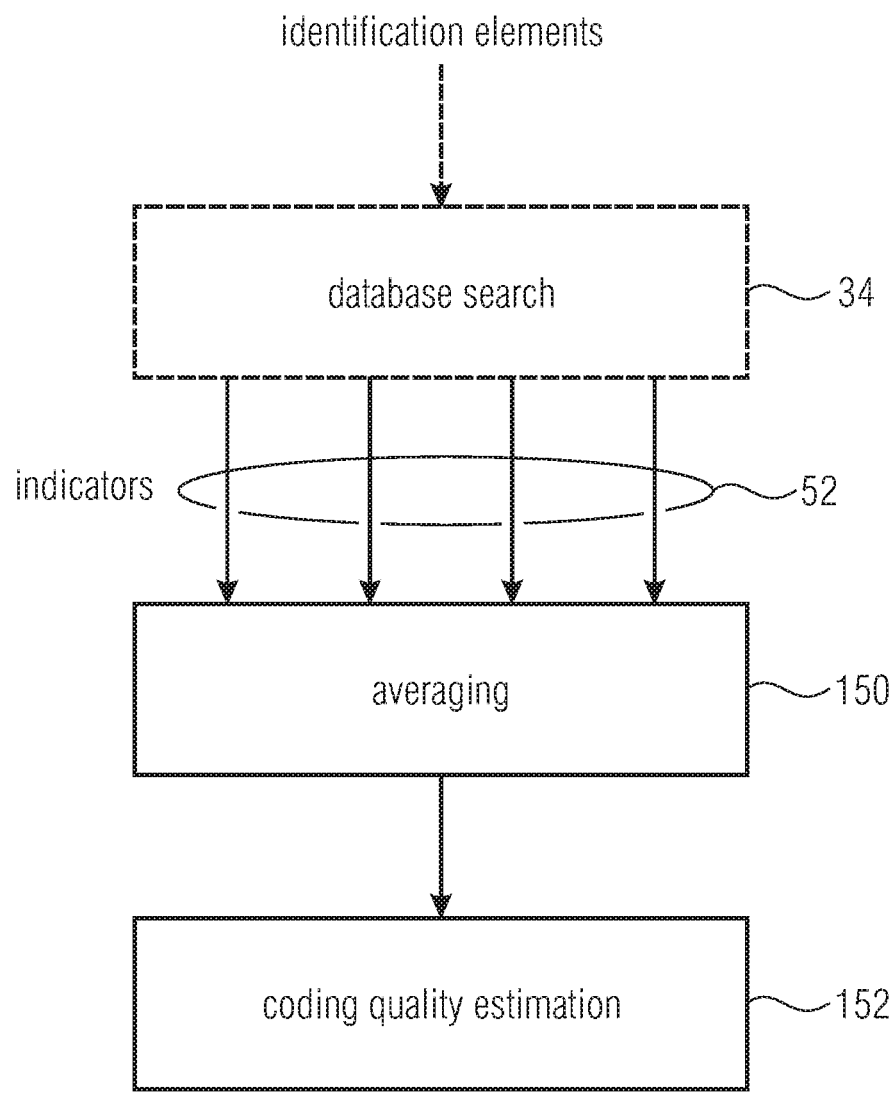
FIG. 10 shows a flowchart for a possible implementation of determining the overall quality while taking into account transmission artifacts in accordance with an embodiment.

FIG. 10 shows a flowchart of a possible implementation of the encoding-quality estimation 94 or quality determination within the quality determiner 46. The parameter sets 52 obtained by means of the identifiers 50 within the database 34 by looking up, and/or the aggregation 58 (cf. FIG. 3) of same for the current viewing period, or the current test section, of the media content and/or video are initially subject to averaging, i.e. averaging over time, in step 150 so as to then perform encoding-quality estimation in a step 152 on the basis of a result of the averaging. More specifically, therefore, by means of the identification elements, or identifiers, that were calculated by the device 32 from the actually transmitted data stream 18, the associated parameter sets and/or indicators 52 from the database 34 are determined and subjected to averaging 150 in a corresponding averaging module. The number of parameter sets 52 subjected to averaging corresponds to the number of frames 26 within the viewing period, as was described in connection with FIG. 2, namely to the viewing period and/or test section within which the encoding-quality estimation is to be performed.

Averaging 150 involves averaging the individual indicators and/or parameters over time. Different averaging processes may be employed, for example, for different indicator categories and/or different ones of the parameters. The following averaging techniques per indicator and/or parameter are possible:

Indicators of similarity analysis:
averaging 1 of said indicator is effected via logistically mapping the individual values with a subsequent L2 norm over the time course of the elements.
averaging 2 of said indicator is effected via logistically mapping the individual values with a subsequent L4 norm over the time course of the elements.

Indicators of edge analysis:
averaging 1 of said indicator is effected via linearly mapping the individual values with a subsequent L2 norm over the temporal elements.
averaging 2 of said indicator is effected via logistically mapping the individual values with a subsequent L2 norm over the temporal elements.

Indicators of block analysis:
The temporally averaged indicator value is the minimum value of the individual values.

Indicators of chrominance analysis:
averaging of said indicators is effected via an L1 norm of the elements.

Indicators for analyzing the time course of the disturbance:
Averaging of the indicators for disturbances that have been introduced is effected via an L1 norm.
Averaging of the indicators for sections that have been removed is effected via an L1 norm.

Quality estimation 152 of the section to be measured is subsequently performed by means of the temporally averaged indicators. To this end, the individual, temporally averaged indicators are supplied to a logistic function and are subsequently subject to linear averaging. The parameters of the logistic function are dependent on the frame size here, too.

The overall quality of the transmitted signals is determined in step 96 by merging the coding quality and the transmission quality. It is to be noted here that a maximum of one encoding-quality value is calculated for each viewing section. Any viewing sections that are missing, for example because data association was not possible due to transmission disturbances, can be calculated by means of interpolation while taking into account the transmission disturbance. As a measure of the overall quality estimation, a single numerical value may be determined, or the distribution of the quality levels may be indicated in the form of a histogram.

It shall therefore once again be noted, eventually, that it is merely by way of example that the above embodiments were mostly related to videos. However, the above embodiments may be readily transferred to audio signals. A combination of the quality determination, i.e. determination of the quality of a combination of audio and video signal, is also feasible.

With regard to identifier generation it shall be noted that in accordance with an embodiment, the former need not necessarily take place in the non-decoded domain, e.g. at the elementary-stream level and, in particular, not necessarily by means of HASH value formation. Rather, it may be possible to also use parts of a decoded version of the data stream section in question in order to generate the identifier. However, what is advantageous is the above described version according to which, in order to determine the identifier, a non-decoded version of the respective data stream section is supplied, at least for the most part, e.g. more than 80% thereof, to a mapping, e.g. to a HASH mapping, which results in a different identifier also in relation to small changes or individual bit errors within said section, so that reliable distinguishability of the data stream sections 28 within the databases 10 is ensured.

Even though it was not pointed out above, it should be obvious that the quality determination service realized by the device 32, the look-up table 34, and the table generation 32 can be made the object of a payment system. In other words, the quality determination concept may be exploited commercially, of course. Royalty revenue might be received for each device 32, for each quality determination process, for each table generation 32, for each access to the table 34, for the duration of the provision and the size of the table 34, or other suitable options.

As the description of FIG. 7 has made clear, a transmission artifact detector 186 may be provided in addition to the elements that were already described with regard to FIG. 3, said transmission artifact detector 186 detecting a defectively received portion of the media data stream 18, the quality determiner 46 may be configured to perform, for the defectively received portion, the quantification 88 of the transmission artifact of the media data stream 18 in an online manner and to use the transmission artifact, that was determined for the defectively received portion, in determining the overall quality in step 96.

Wth regard to offline generation of the database it shall be noted that the possibility that was described there with regard to partitioning into viewing periods may also be dispensed with. Generation of the parameters may also be performed without any such partitioning for the individual media sections 24'.

As was already described, a statistical analysis of the aggregated parameter sets of a test section may be performed such that different statistical evaluations are performed for different ones of the parameters contained within the aggregated parameter sets, for example that different statistical moments and measures are determined for central tendency and/or dispersion for different ones of the parameters, but these are not limited to those that were mentioned above by way of example.

In order to show the advantages and effects of the above-outlined embodiments more realistically, a four-layer quality model is used and will be presented below with reference to FIG. 12, said model reflecting the different sources that might contribute artifacts during transmission.

Content Quality: original content can be provided in masterful studio quality, either uncompressed, or encoded only gently at very high bitrates. The term "content quality" therefore refers to the highest available quality of the original content. It is defined by the original picture, or frame, size (UHD, HD, or SD), progressive or interlaced scanning, and by the original frame rate (29.97, 25, or 24 frames/second (fps)). Raw video content, which would involve enormous storage/transmission resources, is encoded before it can be stored and distributed.

Media Stream Quality: For distribution over IP, the video needs to be transcoded (i.e. more efficiently re-coded) so as to match various distribution formats. We will refer to this layer as the "media stream quality". The quality of the compressed video at this stage is defined by the quality of the original content plus the coding quality. The latter is mainly determined by the type of encoder, mostly H.264, along with encoding parameters, predominantly the output bitrate, as well as several other settings. Such settings include the target frame rate, a ratio of I, B, and P frames, or pictures, as well as other selection possibilities which influence the encoding efficiency, i.e. the advantageous type of entropy encoding: CAVLC (context-based adaptive variable length encoding) or CABAC (context-based adaptive binary arithmetic encoding). Another aspect that might determine the media stream quality is whether the encoder is set to produce a constant bitrate (CBR) or a variable bitrate (VBR).

All adaptive-streaming solutions have in common that the content is to be provided at various bitrates and, thus, qualities, while the client will more or less "smoothly" switch between the different quality levels as allowed by the respective net or network. In practice, this might mean that the same content resides on the server in, e.g., up to 11 streams, each encoded at different bitrates and for different target screens. Note that not only the bitrate might be going to change when switching from one stream to another, depending on the available bitrate, the frame size (resolution) and the encoder profile might also be going to change.

Transmission Quality: Packet transmission in actual networks is rarely free from losses. Bandwidth mismatches, packet drops, latency, and other transmission impairments may lead to severe degradation of video quality and thus reduce the QoE of a subscriber. Consequently, the transmission quality is determined by said transmission impairments. Various streaming setups and protocols have been devised so as to cope with the real-time constraints of stationary and mobile networks, in particular to adapt to the currently available bitrate. While for progressive download the frame size and bitrate, once selected, do not change during the video presentation, the dynamic element comes into play for adaptive-streaming protocols when the video (and/or audio) is encoded at multiple bitrates is encoded for each 2- to 4-second chunk. The client/player now can select those chunks which suit its needs best—the best bitrates and resolutions it can handle at that moment. Web servers typically deliver data as fast as the network bandwidth allows. The client can readily estimate the user bandwidth and decide whether to download larger or smaller chunks ahead of time.

Presentation Quality: The key factor for perceived presentation quality will be the client device itself: flat-screen television, Tablet, or Smartphone. In addition to the screen size and the viewing environment, which may involve totally different user expectations, the player software has a noticable influence on the presentation quality: parameters such as the size of the play-out and download buffers, for example, are fully customizable.

In addition to the above aspects, the presentation quality depends on a number of aspects at the client's side, namely:
the CPU power, memory and connectivity constraints of the end-user device.
the operating system and its inherent support of streaming protocols
the performance of the streaming protocol in use, i.e. effectively, the client/server negotiation the player software including re-buffering, error concealment techniques, etc., which are either a set of features of the operating system, an Internet browser, a (third-party) plug-in (e.g. Adobe Flash, Microsoft Silverlight), or an App provided by an OTT service provider, and finally, the size, resolution and refresh rate of the (native) display, or a connected monitor or TV, its interfacing (WLAN, RGB, or HDMI), along with the viewing environment.

Figure 12:
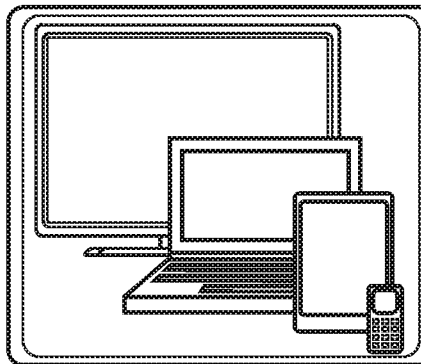
FIG. 12 shows a schematic representation of a four-layer OTT (over-the-top) quality model which represents the overall QoE of an OTT streaming service and that is modeled by four layers, each of which is at the hands of the parties involved in the infrastructure that are in charge.
Figure 12:
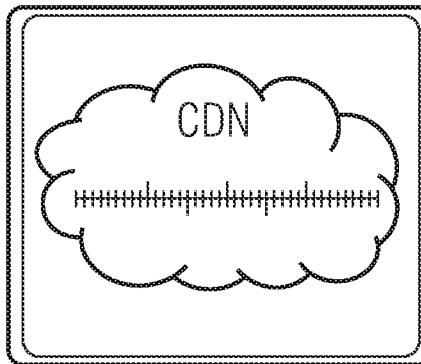
Figure 12:
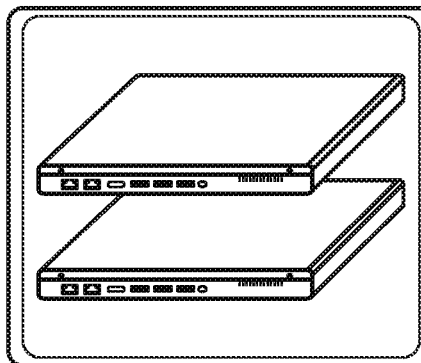
Figure 12:
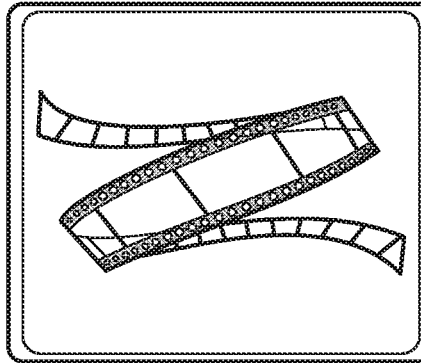

The four-layer OTT quality model that has been devised is shown in FIG. 12. The four-layer approach that has just been presented is very suitable for those parties that are involved, in the case of OTT streaming services, in a QoE rivalry with the subscribers: actually, the four-layer model of FIG. 12 includes a 1:1 correspondence with said parties involved:

Content Quality falls under the responsibility of the content owner. Examples of content owners are Sony Pictures, Paramount, Universal, Warner Bros., etc. (registered brands). They want to extend their revenue streams by marketing their movie and TV series productions via new VoD channels.

Media Stream Quality falls under the responsibility of the OTT provider, examples of OTT provides are Netflix, Hulu, Amazon/Lovefilm, etc. (registered brands). They compete with each other for new business models for online video offerings, but also compete with content owners who set up OTT services themselves.

Transmission Quality clearly comes under the responsibility of the network provider. Examples of network providers are BBC, Deutsche Telekom, Time Warner Cable. These provide the transport infrastructure, but also establish their own VoD offerings (BBC iPlayer, Telekom Entertain), and Presentation Quality falls under the prime responsibility of the device, or handset, manufacturer. Such manufacturers of end-user devices such as connected and smart TVs, set-top-boxes ("STB", including connected Blu-Ray players and game consoles), PCs, Tablets and Smartphones, and vendors of operating and standard software (Microsoft, Adobe, Apple) supply the user interface to the viewer (=subscriber).

On the basis of the four-layer quality model we can summarize that the requirements placed upon an accurate perception measure suitable for adaptive streaming are as follows:

Evaluation of Content Quality: Depending on the accessibility, either the masterly studio quality of the original content or a (gently encoded) version for distribution is considered to represent the content quality. This "reference" quality will form the basis for any FR measurement to evaluate the amount of compression artifacts that accumulate by encoding and transcoding later on. Consequently, an adaptive-streaming quality metrics should be able to accommodate this reference signal.

Evaluation of Media Stream Quality: For adaptive video streaming, not only the bitrate is going to change when switching from one stream to another, but depending on the available bitrate, the frame size (resolution) and the encoder profile is also going to change. Consequently, a perceptual video quality measure for adaptive streaming ideally is suited for scalability of resolutions and frame sizes.

Evaluation of Transmission Quality: A perceptual quality measure suitable for adaptive streaming need not only be sensitive to all kinds of transmission artifacts of wired and wireless IP networks, but ideally, it is suited to evaluate the artifacts resulting from adaptive switching of chunks of different bitrates in a long-term scale context. This also involves scalability in the time domain, ranging from a micro-scale (chunk length) to a macro-scale (actual content length).

Evaluation of Presentation Quality: The key factor for the perceived presentation quality will be the client device itself: flat-screen TV, Tablet, or Smartphone. In addition the screen size and the viewing environment, which may include completely different user expectations, a perceptual quality measure suitable for adaptive streaming is sensitive to all kinds of artifacts introduced by the player software.

To summarize, an accurate perceptual video quality measurement for adaptive streaming should not only be able to continuously track the different bitrates (=qualities), but also to evaluate how often the player will switch streams and how "smooth" the player is able to interact with the server in a congested network. In addition, it should be able to measure and compare the picture quality for different frame sizes and frame rates. Finally, the device characteristics and viewing environment should be taken into account for an accurate prediction of the perceived QoE.

The embodiments presented above can meet said requirements or at least form a basis for meeting all of said requirements.

The first idea behind the embodiments presented above is that an analysis of 2- to 4-second videos, which in adaptive video streaming is generally considered to be the chunk (sequence) length, still fits reasonably well into the standardized use case of current standards. The embodiments presented above provide a possibility of combining concatenated measurements for relatively long sequences.

The second idea behind the embodiments presented above is that the four quality layers mentioned (Content, Media, Transmission and Presentation Quality) may be grouped into dynamic and quasi-constant quality aspects:

The coding quality of a media stream present on a streaming server (cf. 10 and 12 in FIG. 1) for a typical on-demand OTT application can be considered as being "quasi-constant". Once encoded and formatted into different quality levels the coding quality of the files on the server remains the same.

The Transmission and Presentation Quality, on the other hand, dynamically change for each request of specific content through a specific network.

Against the background of these two aspects, the above embodiments are able to cover the quasi-constant and dynamic aspects in a manner that enables combining, e.g., FR highly accuracy video quality measurement with real-time measurement, even on mobile devices. Consequently, a hybrid setup is used which consists of two main blocks: a media stream quality analysis (cf. 64 and 66) and a client probe (cf. FIG. 3).

It is the task of media stream quality analysis to determine the media stream quality of a specific encoded content as present on the streaming server (cf. 10 and 12 in FIG. 1). For the case of adaptive streaming this means assessing the media stream quality for each quality level of such content (cf. FIGS. 2 and 5).

This analysis is performed in two steps: acquisition of the content and the actual quality measurement.

During the acquisition, all chunks of all encoded quality levels (cf. $Q_1$ to $Q_4$ in FIG. 2) are retrieved from the streaming server—in accordance with the above-mentioned media data stream sections 24. Since adaptive streaming runs over TCP, there is no risk of a packet loss that would additionally introduce distortions during the acquisition.

However, care should be taken to ensure that all of the quality levels of the content are completely acquired without any gaps such as might be caused by a lost chunk on the server or by an incorrect manifest file.

The actual media stream quality analysis may, for example and as was set forth above, be built on the standardized FR video quality model PEVQ, which has been further advanced to ensure a proper analysis of short length video chunks. A reference video, usually the original content of high resolution, needs to be provided as an input in PEVQ, while the degraded videos are generated by decoding the acquired quality level with a reference decoder. The analysis (cf. FIG. 5) yields a set of quality values for each frame of each quality level. By aggregating (cf. FIG. 4) these quality values over a specific short video duration, e.g. 10 s, it is possible to calculate, e.g., a J.247 compliant MOS score for the corresponding video.

The media stream quality database (cf. 10) stores the quality values along with several items of meta information of the respective content. The information in the database is then used by the client probe (namely 32 in FIG. 1) during measurement of the dynamic quality aspects.

The main advantage of measuring the media stream quality from the decoded video signals consists in that analysis is agnostic of the underlying coding technology used. This ensures accurate and consistent measurement results across different coding systems. Another notable advantage is that, since the media stream quality is considered to be quasi-constant, the database needs to be generated only once for each content. This means that computationally demanding video decoding and, possibly, FR quality analysis need not be repeated for every test, nor run on the client device, but can be allocated to a dedicated off-line media stream quality analysis device.

The task of the client probe is to analyze the dynamic video streaming quality (i.e. Transmission and Presentation Quality) and combine it with the information about the static quality aspects (Content and Media Stream Quality) for the calculation of a final QoE score.

For that purpose, the probe captures the incoming HTTP traffic, followed by a bit-stream analysis:

During this bit-stream analysis, network packet properties such as jitter and packet re-sends, for example, may be taken into account. For each frame of the streamed video content, the arrival time at the client can be calculated.

This information is then fed into a streaming player model which models the play-out behavior of the software player on the client device. Consequently, the player-model output represents the real play-out behavior of the video under the current network conditions. This includes effects such as initial buffering (time until first play-out) and re-buffering/stalling.

It is highly typical of adaptive streaming that the software player on the client device is in charge of negotiating the bitrate for each chunk with the server as a function of the network congestion and, thus, the buffer running empty. Consequently, quality values for the media stream quality can now be accurately identified in the database for each chunk and each bitrate, as is requested from the player. The actual quality of the streamed video is then calculated by aggregating and post-processing the stored quality values for the received video sequence.

The hybrid approach presented above also has the advantage of processing the accurate coding quality of the actual received video at the client without the computational burden of the FR measurement, while the latter may readily be performed during off-line preprocessed media stream analysis.

The probe might run, for example, on a PC-based tester with HTTP access to the database or, for mobile and portable applications, the probe might even be embedded in software on the streaming client, which software runs in parallel with the streaming player. Depending on the respective case of utilization, e.g. so called drive and/or walk testing of mobile networks (i.e. measurements with mobile devices in vehicles or on foot), a well-defined and thus highly limited set of video test sequences will usually be employed. In addition, it is advantageous to store an off-line excerpt of the database on the client device so as to rule out any influence on the measurement by additional network traffic during database access.

Thus, the concept of the embodiments explained above enables a number of applications and utilizations. The optimization potential provides useful guidance for all the parties involved, i.e. content owners, network and CDN operators, OTT services providers, and device manufacturers.

The hybrid architecture is excellently suited to combine the advantage of low-complexity bit-stream analysis at the client's side with the highly accurate, but complex FR measurement of a true pixel-based picture quality analysis.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device) such as a microprocessor, a programmable computer or an electronic circuit, for example. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM, or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example.

The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for determining a quality of a media data stream streamed via an adaptive streaming protocol and comprising a sequence of data stream sections which transmit a sequence of media sections of a media content at quality-to-bitrate levels that vary across the media content by variation of, for each data stream section, as to which of a plurality of media versions of mutually different quality-to-bitrate levels the respective data stream section is taken from, the device comprising:
a processor which forms an identifier generator, a look-up unit, an aggregator, and a quality determiner, wherein:
the identifier generator configured to, for each stream section, derives, by applying a hash function onto the respective data stream section an identifier for the respective section;
the look-up unit configured to look up, for each data stream section, a parameter set from a look-up table by means of the identifier derived for the respective data stream section;
the aggregator configured to aggregate the parameter sets that are looked up for data stream sections that transmit media sections that lie within a test section of the media content, so as to obtain a parameter set aggregation which depends on the variation of the quality-to-bitrate levels across the media content; and
the quality determiner configured to determine the quality on the basis of the aggregated parameter sets.

2. The device as claimed in claim 1, wherein the identifier generator configured to perform the derivation of the identifier on the basis of a non-decoded version of the respective data stream section.

3. The device as claimed in claim 1, wherein the sequence of data stream sections transmit the different media sections of the media content in such a manner that a variation of the quality-to-bitrate levels takes place in units of sections of the media data stream that are self-contained, so as to be reproducible separately from other sections of the media data stream, each section comprising one or more media sections.

4. The device as claimed in claim 3, wherein the sections are Groups of Pictures (GOPs) or individual files.

5. The device as claimed in claim 1, wherein the data stream sections transmit, as a media section in each case, a picture of a video as a media content.

6. The device as claimed in claim 1, wherein the processor further forms a transmission artifact detector configured to perform a defectively received portion of the media data stream, wherein the quality determiner being configured to perform an online quantification of a transmission artifact of the media data stream for the defectively received portion and to use the transmission artifact determined for the defectively received portion for determining the quality.

7. The device as claimed in claim 1, wherein each parameter set comprises one or more of the following:
a correlation-based measure of similarity between a reconstructed version of the media section that is transmitted by the respective data stream section and a corresponding section of a reference media content;
a measure of differences of edges located within the respective media section and edges located within the corresponding reference section;
a measure of block disturbances within the respective media section;
a measure of a difference of chrominance planes within the respective media section and the corresponding reference media section; and
a measure of differences of temporal changes of edges located within the respective section and temporal changes of edges located within the corresponding media section.

8. The device as claimed in claim 1, wherein the quality determiner is configured to determine the quality from a stochastic analysis of the aggregated quality parameter sets.

9. A method of determining a quality of a media data stream streamed via an adaptive streaming protocol and comprising a sequence of data stream sections which transmit a sequence of media sections of a media content at quality-to-bitrate levels that vary across the media content by variation of, for each data stream section, as to which of a plurality of media versions of mutually different quality-to-bitrate levels the respective data stream section is taken from, the method comprising:

for each data stream section, deriving, by applying a hash function onto the respective data stream section, an identifier for the respective section;

looking up, for each data stream section, a parameter set from a look-up table by means of the identifier derived for the respective data stream section; and aggregating the parameter sets that are looked up for data stream sections that transmit media sections that lie within a test section of the media content so as to obtain a parameter set aggregation which depends on the variation of the quality-to-bitrate levels across the media content; and determining the quality on the basis of the aggregated parameter sets.

10. A non-transitory computer readable medium storing a computer program comprising a program code for performing the method as claimed in claim 9, when the program runs on a computer.

11. The device according to claim 1, configured to operate in a streaming client device for retrieving the media data stream from a server via the adaptive streaming protocol.

12. The device according to claim 11, wherein the server stores, in a look-up table, for each media section of a media content, for each of a plurality of media versions of mutually different quality-to-bitrate levels, a parameter set which describes a coding quality of a data stream section of the respective media version, into which the respective media section is encoded, and an identifier which is associated with the parameter set and which can be derived by applying a hash function that is the same for all of the data stream sections, onto the data stream section into which the respective media section is encoded.

13. The device according to claim 1, configured to determine the quality according to a no-reference quality assessment.

* * * * *